United States Patent
Hansen et al.

(10) Patent No.: US 7,233,773 B2
(45) Date of Patent: Jun. 19, 2007

(54) CONFIGURING A MIMO COMMUNICATION

(75) Inventors: Christopher J. Hansen, Sunnyvale, CA (US); Jason A. Trachewsky, Menlo Park, CA (US); R. Tushar Moorti, Mountain View, CA (US); Matthew J. Fischer, Mountain View, CA (US); Christopher Young, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 429 days.

(21) Appl. No.: 10/973,549

(22) Filed: Oct. 26, 2004

(65) Prior Publication Data

US 2005/0181728 A1    Aug. 18, 2005

Related U.S. Application Data

(60) Provisional application No. 60/568,914, filed on May 7, 2004, provisional application No. 60/562,168, filed on Apr. 14, 2004, provisional application No. 60/545,854, filed on Feb. 19, 2004, provisional application No. 60/544,605, filed on Feb. 13, 2004.

(51) Int. Cl.
*H04B 1/00*    (2006.01)
*H04B 7/00*    (2006.01)

(52) U.S. Cl. .................... 455/69; 455/562.1; 455/41.2; 370/334; 370/338; 370/329

(58) Field of Classification Search .................. 455/69, 455/562.1, 41.2; 370/334, 329, 328, 401, 370/465, 338
See application file for complete search history.

(56) References Cited

U.S. PATENT DOCUMENTS

| 2003/0072255 A1 | 4/2003 | Ma et al. |
| 2003/0072452 A1 | 4/2003 | Mody et al. |
| 2005/0054313 A1* | 3/2005 | Gummadi et al. ....... 455/226.1 |
| 2005/0054383 A1* | 3/2005 | Webster et al. .......... 455/562.1 |
| 2005/0153723 A1* | 7/2005 | Hosur et al. ................ 455/515 |
| 2005/0163236 A1* | 7/2005 | Hammerschmidt et al. . 375/260 |

* cited by examiner

OTHER PUBLICATIONS

Jianhua Liu et al, "A MIMO System with Backward Compatibility for OFDM Based WLANs", Signal Processing Advances in Wireless Communications, 2003, SPAWC 2003, 4th IEEE Workshop in Rome, Italy, Jun. 15-18, 2003, Piscataway, NJ, USA, IEEE, US, Jun. 15, 2003, pp. 130-134, XP010713389, ISBN: 0-7803-7858-X.

*Primary Examiner*—Matthew Anderson
*Assistant Examiner*—Tuan Pham
(74) *Attorney, Agent, or Firm*—Garlick Harrison & Markison; Timothy W. Markison

(57) ABSTRACT

A method for configuring a multiple input multiple output (MIMO) wireless communication begins by generating a first preamble for a first antenna of the MIMO communication, wherein the first preamble includes a carrier detect field, a first channel select field, a first signal field, and a second signal field. The method continues by generating a second preamble for at least one other antenna of the MIMO communication, wherein the second preamble includes the carrier detect field, a plurality of channel select fields, and the second signal field. The method continues by simultaneously transmitting the carrier detect field via the first antenna and the least one other antenna. The method continues by transmitting the first channel select field and the first signal field via the first antenna. The method continues by, subsequent to the transmitting the first channel select field and the first signal field via the first antenna, transmitting the plurality of channel select fields via the at least one other antenna. The method continues by simultaneously transmitting the second signal field via the first antenna and the at least one other antenna.

15 Claims, 21 Drawing Sheets

CONFIGURING A MIMO COMMUNICATION

This patent application is claiming priority under 35 USC § 119(e) to four co-pending provisional patent applications: The first is entitled MULTIPLE PROTOCOL WIRELESS COMMUNICATIONS IN A WLAN, having a provisional Ser. No. of 60/544,605, and a filing date of Feb. 13, 2004; the second is entitled WLAN TRANSMITTER HAVING HIGH DATA THROUGHPUT having a provisional Ser. No. of 60/545,854, and a filing date of Feb. 19, 2004; the third is entitled MIMO PROTOCOL FOR WIRELESS COMMUNICATIONS, having a provisional Ser. No. of 60/568,914, and a provisional filing date of May 7, 2004; and the fourth is entitled LONG TRAINING SEQUENCE FOR MIMO WLAN SYSTEMS, having a provisional Ser. No. of 60/562,168, and a provisional filing date of Apr. 14, 2004.

BACKGROUND OF THE INVENTION

1. Technical Field of the Invention

This invention relates generally to wireless communication systems and more particularly to supporting multiple wireless communication protocols within a wireless local area network.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, the standard to which a wireless communication device is compliant within a wireless communication system may vary. For instance, as the IEEE 802.11 specification has evolved from IEEE 802.11 to IEEE 802.11b to IEEE 802.11a and to IEEE 802.11g, wireless communication devices that are compliant with IEEE 802.11b may exist in the same wireless local area network (WLAN) as IEEE 802.11g compliant wireless communication devices. As another example, IEEE 802.11a compliant wireless communication devices may reside in the same WLAN as IEEE 802.11g compliant wireless communication devices. When legacy devices (i.e., those compliant with an earlier version of a standard) reside in the same WLAN as devices compliant with later versions of the standard, a mechanism is employed to insure that legacy devices know when the newer version devices are utilizing the wireless channel as to avoid a collision.

For instance, backward compatibility with legacy devices has been enabled exclusively at either the physical (PHY) layer (in the case of IEEE 802.11b) or the Media-Specific Access Control (MAC) layer (in the case of 802.11g). At the PHY layer, backward compatibility is achieved by re-using the PHY preamble from a previous standard. In this instance, legacy devices will decode the preamble portion of all signals, which provides sufficient information for determining that the wireless channel is in use for a specific period of time, thereby avoid collisions even though the legacy devices cannot filly demodulate and/or decode the transmitted frame(s).

At the MAC layer, backward compatibility with legacy devices is enabled by forcing devices that are compliant with a newer version of the standard to transmit special frames using modes or data rates that are employed by legacy devices. For example, the newer devices may transmit Clear to Send/Ready to Send (CTS/RTS) exchange frames and/or CTS to self frames as are employed in IEEE 802.11g. These special frames contain information that sets the NAV (network allocation vector) of legacy devices such that these devices know when the wireless channel is in use by newer stations.

Both of the existing mechanisms for backward compatibility suffer from a performance loss relative to that which can be achieved without backward compatibility and are used independently of each other.

Therefore, a need exists for a method and apparatus that enables multiple protocols to be supported within a wireless communication system, including wireless local area networks, for MIMO communications.

BRIEF SUMMARY OF THE INVENTION

The configuring of a MIMO communication of the present invention substantially meets these needs and others. In one embodiment, a method for configuring a multiple input multiple output (MIMO) wireless communication begins by generating a first preamble for a first antenna of the MIMO communication, wherein the first preamble includes a carrier detect field, a first channel select field, a first signal field, and a second signal field. The method continues by generating a second preamble for at least one other antenna of the MIMO communication, wherein the second preamble includes the carrier detect field, a plurality of channel select fields, and the second signal field. The method continues by simultaneously transmitting the carrier detect field via the first antenna and the least one other antenna. The method continues by transmitting the first channel select field and the first signal field via the first antenna. The method continues by, subsequent to the transmitting the first channel select field and the first signal field via the first antenna, transmitting the plurality of channel select fields via the at least one other antenna. The method continues by simultaneously transmitting the second signal field via the first antenna and the at least one other antenna.

DETAILED DESCRIPTION OF THE INVENTION

Figure 1:
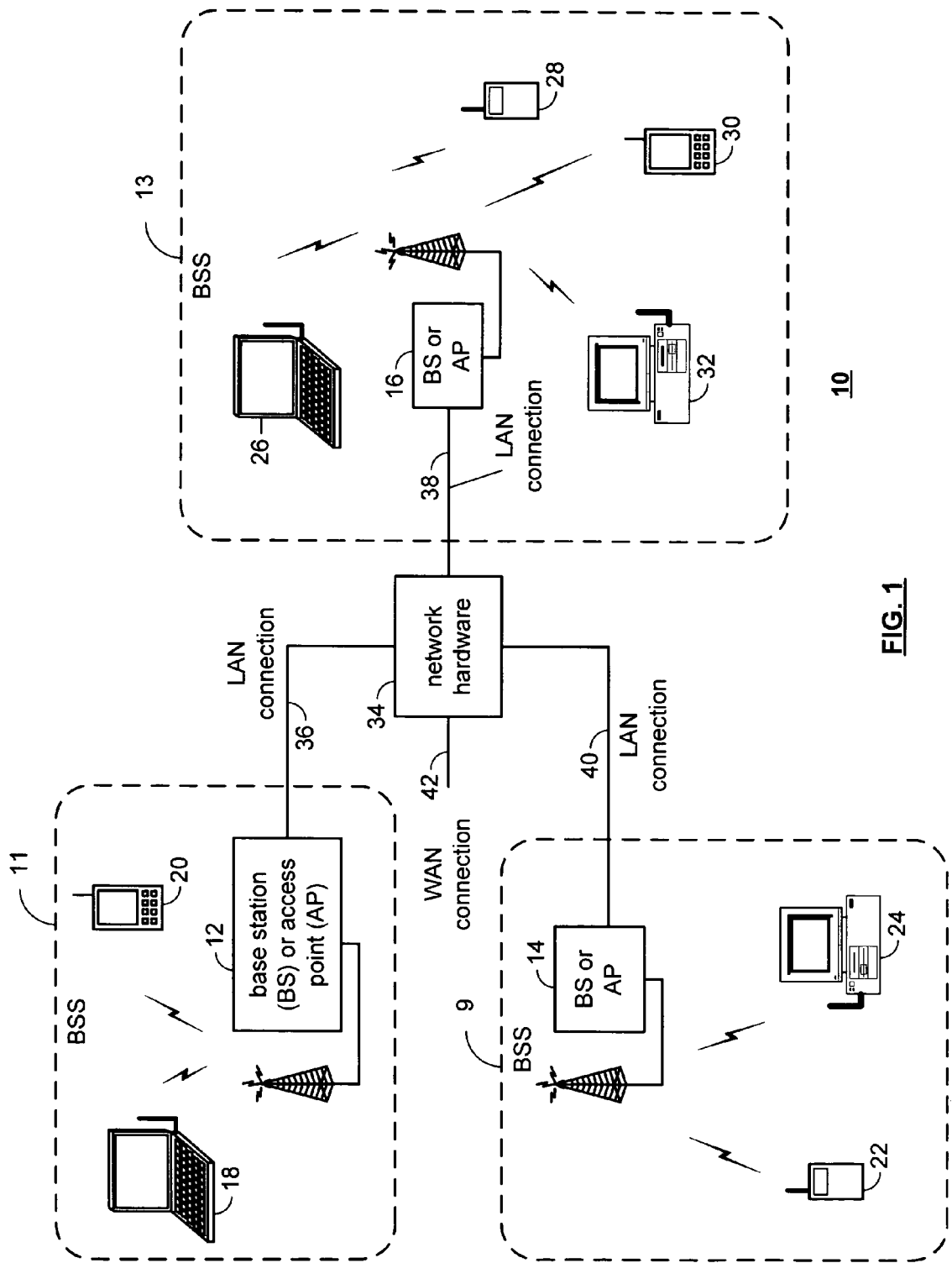
FIG. 1 is a schematic block diagram of a wireless communication system in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2 and/or FIG. 3.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its regional area, which is generally referred to as a basic service set (BSS) 9, 11, 13. Typically, the wireless communication devices register with a particular base station or access point 12–14 to receive services from the communication system 10. For direct connections (i.e., point-to-point communications within an independent basic service set[IBSS]), wireless communication devices communicate directly via an allocated channel to produce an ad-hoc network.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
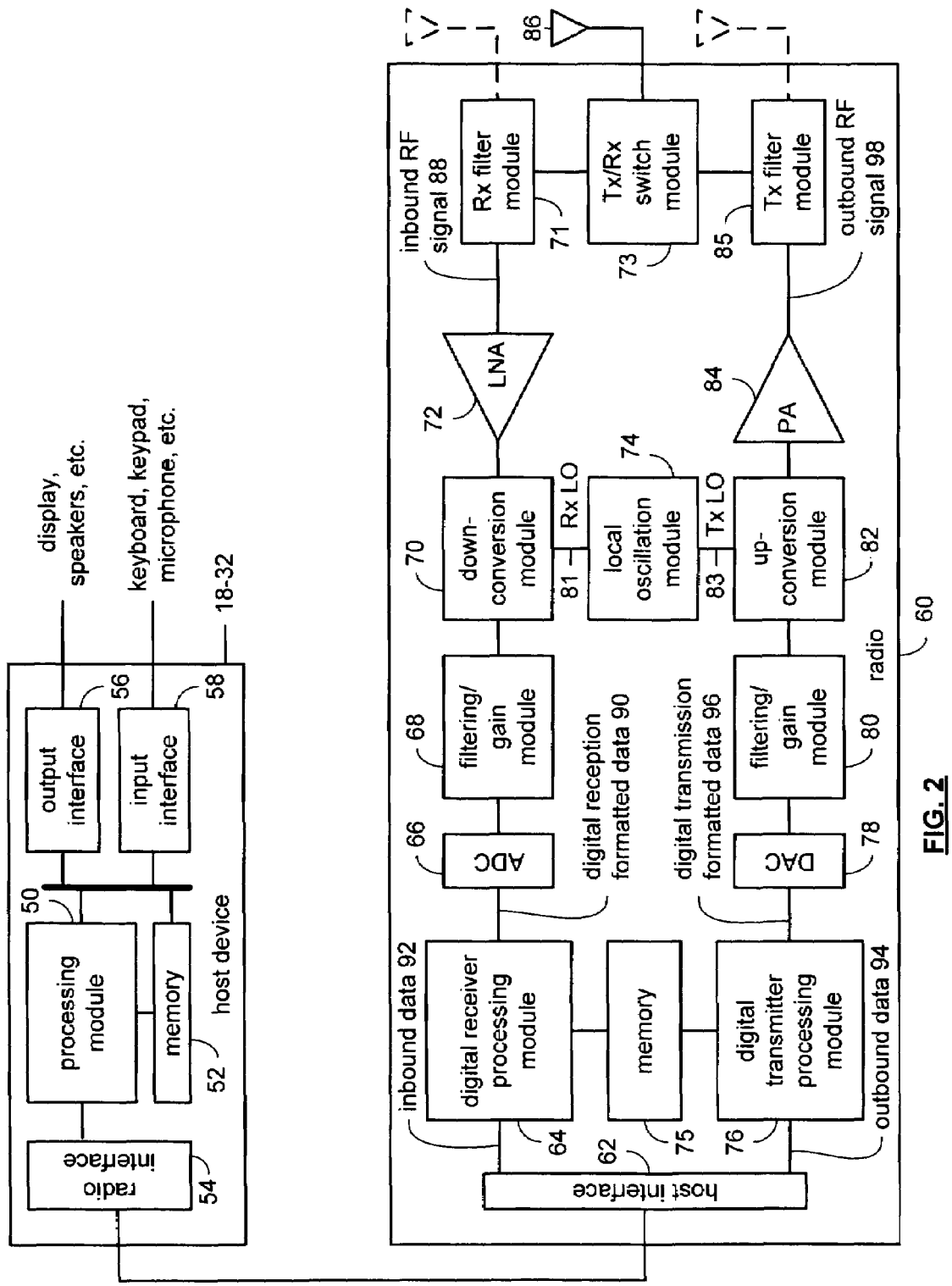
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, memory 75, a digital transmitter processing module 76, and a radio transceiver. The radio transceiver includes an analog-to-digital converter 66, a filtering/gain module 68, an IF mixing down conversion stage 70, a receiver filter 71, a low noise amplifier 72, a transmitter/receiver switch 73, a local oscillation module 74, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively, in accordance with one or more wireless communication standards and as further function to implement one or more aspects of the functionality described with reference to FIGS. 3–11. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 and versions thereof, Bluetooth and versions thereof, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
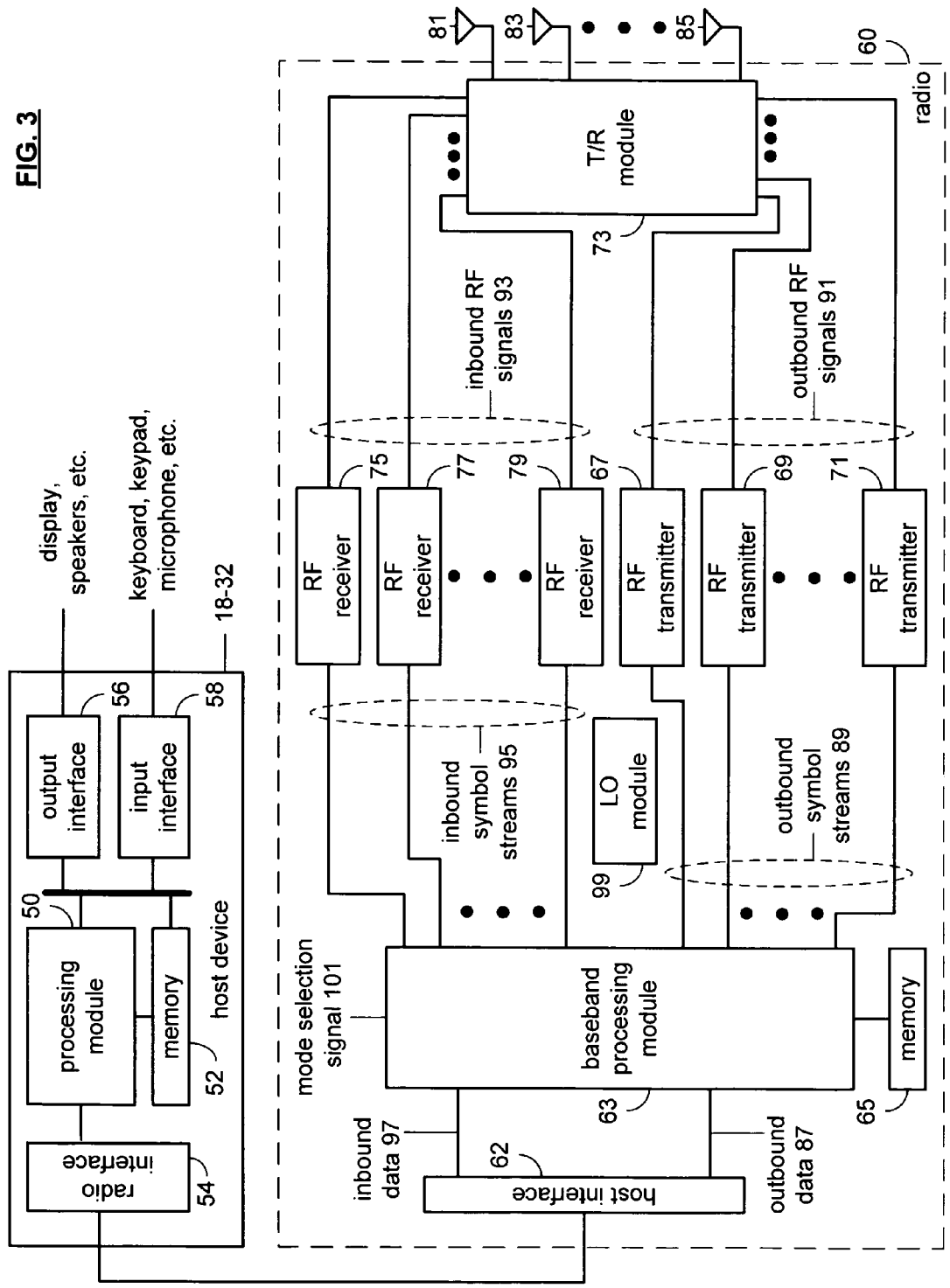
FIG. 3 is a schematic block diagram of another wireless communication device in accordance with the present invention.

FIG. 3 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

Radio 60 includes a host interface 62, a baseband processing module 63, memory 65, a plurality of radio frequency (RF) transmitters 67, 69, 71, a transmit/receive (T/R) module 73, a plurality of antennas 81, 83, 85, a plurality of RF receivers 75, 77, 79, and a local oscillation module 99. The baseband processing module 63, in combination with operational instructions stored in memory 65, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and/or digital baseband to IF conversion. The baseband processing modules 63 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 63 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 87 from the host device via the host interface 62. The baseband processing module 63 receives the outbound data 87 and, based on a mode selection signal 101, produces one or more outbound symbol streams 89. The mode selection signal 101 will indicate a particular mode as are indicated in mode selection tables. For example, the mode selection signal 101, with reference to table 1 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS), error vector magnitude in decibels (EVM), sensitivity which indicates the maximum receive power required to obtain a target packet error rate (e.g., 10% for IEEE 802.11a), adjacent channel rejection (ACR), and an alternate adjacent channel rejection (AACR).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennas may be utilized to achieve the higher bandwidths. In this instance, the mode select would further indicate the number of antennas to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2–4 antennas and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1–4 antennas and a corresponding spatial time code rate. Table 10 further illustrates a particular modulation scheme code rate and NBPSC values. Table 11 provides the power spectral density mask for table 10 and table 12provides the channelization for table 10.

The baseband processing module 63, based on the mode selection signal 101 produces the one or more outbound symbol streams 89 from the output data 88. For example, if the mode selection signal 101 indicates that a single transmit antenna is being utilized for the particular mode that has been selected, the baseband processing module 63 will produce a single outbound symbol stream 89. Alternatively, if the mode select signal indicates 2, 3 or 4 antennas, the baseband processing module 63 will produce 2, 3 or 4 outbound symbol streams 89 corresponding to the number of antennas from the output data 88.

Depending on the number of outbound streams 89 produced by the baseband module 63, a corresponding number of the RF transmitters 67, 69, 71 will be enabled to convert the outbound symbol streams 89 into outbound RF signals 91. The implementation of the RF transmitters 67, 69, 71 will be further described with reference to FIG. 4. The transmit/receive module 73 receives the outbound RF signals 91 and provides each outbound RF signal to a corresponding antenna 81, 83, 85.

When the radio 60 is in the receive mode, the transmit/receive module 73 receives one or more inbound RF signals via the antennas 81, 83, 85. The T/R module 73 provides the inbound RF signals 93 to one or more RF receivers 75, 77, 79. The RF receiver 75, 77, 79, which will be described in greater detail with reference to FIG. 4, converts the inbound RF signals 93 into a corresponding number of inbound symbol streams 96. The number of inbound symbol streams 95 will correspond to the particular mode in which the data was received (recall that the mode may be any one of the modes illustrated in tables 1–12). The baseband processing module 63 receives the inbound symbol streams 89 and converts them into inbound data 97, which is provided to the host device 18–32 via the host interface 62.

As one of average skill in the art will appreciate, the wireless communication device of FIG. 3 may be implemented using one or more integrated circuits. For example, the host device may be implemented on one integrated circuit, the baseband processing module 63 and memory 65 may be implemented on a second integrated circuit, and the remaining components of the radio 60, less the antennas 81, 83, 85, may be implemented on a third integrated circuit. As an alternate example, the radio 60 may be implemented on a single integrated circuit. As yet another example, the processing module 50 of the host device and the baseband processing module 63 may be a common processing device implemented on a single integrated circuit. Further, the memory 52 and memory 65 may be implemented on a single integrated circuit and/or on the same integrated circuit as the common processing modules of processing module 50 and the baseband processing module 63.

Figure 4:
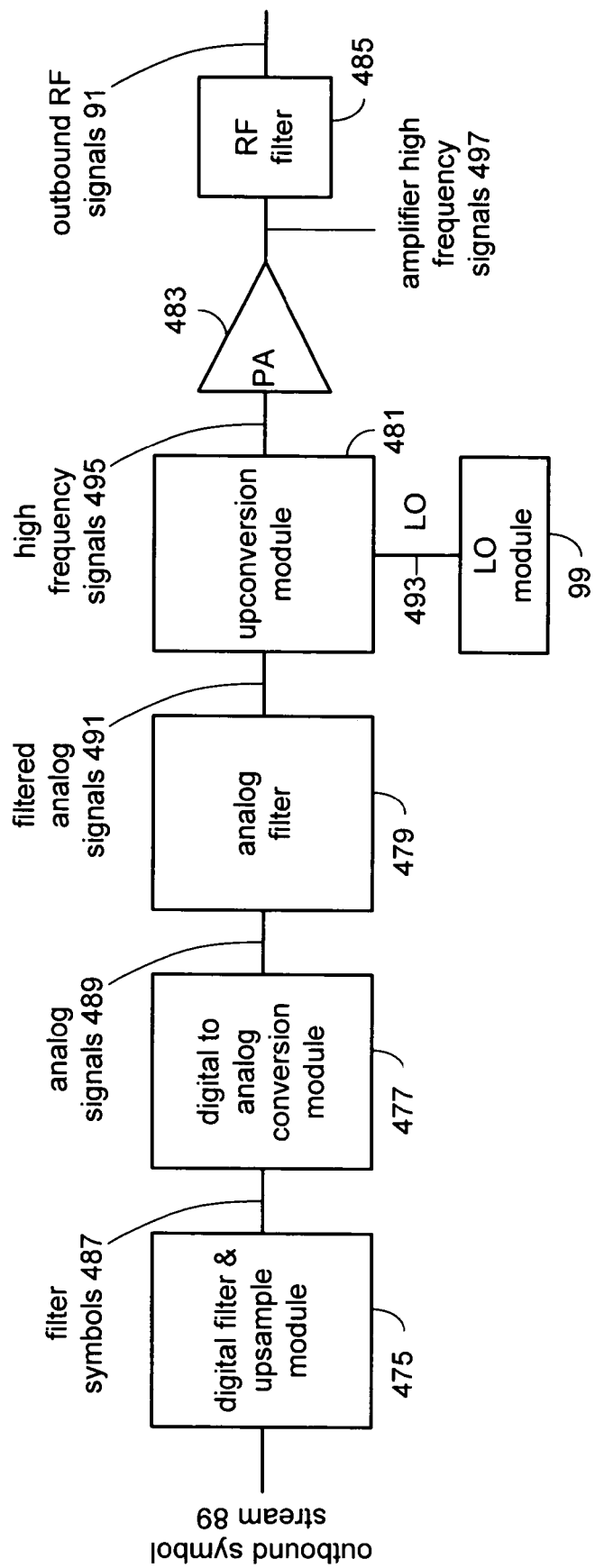
FIG. 4 is a schematic block diagram of an RF transmitter in accordance with the present invention.

FIG. 4 is a schematic block diagram of an embodiment of an RF transmitter 67, 69, 71. The RF transmitter includes a digital filter and up-sampling module 475, a digital-to-analog conversion module 477, an analog filter 479, and up-conversion module 81, a power amplifier 483 and a RF filter 485. The digital filter and up-sampling module 475 receives one of the outbound symbol streams 89 and digitally filters it and then up-samples the rate of the symbol streams to a desired rate to produce the filtered symbol streams 487. The digital-to-analog conversion module 477 converts the filtered symbols 487 into analog signals 489. The analog signals may include an in-phase component and a quadrature component.

The analog filter 479 filters the analog signals 489 to produce filtered analog signals 491. The up-conversion module 481, which may include a pair of mixers and a filter, mixes the filtered analog signals 491 with a local oscillation 493, which is produced by local oscillation module 99, to produce high frequency signals 495. The frequency of the high frequency signals 495 corresponds to the frequency of the RF signals 492.

The power amplifier 483 amplifies the high frequency signals 495 to produce amplified high frequency signals 497. The RF filter 485, which may be a high frequency band-pass filter, filters the amplified high frequency signals 497 to produce the desired output RF signals 91.

As one of average skill in the art will appreciate, each of the radio frequency transmitters 67, 69, 71 will include a similar architecture as illustrated in FIG. 4 and further include a shut-down mechanism such that when the particular radio frequency transmitter is not required, it is disabled in such a manner that it does not produce interfering signals and/or noise.

Figure 5:
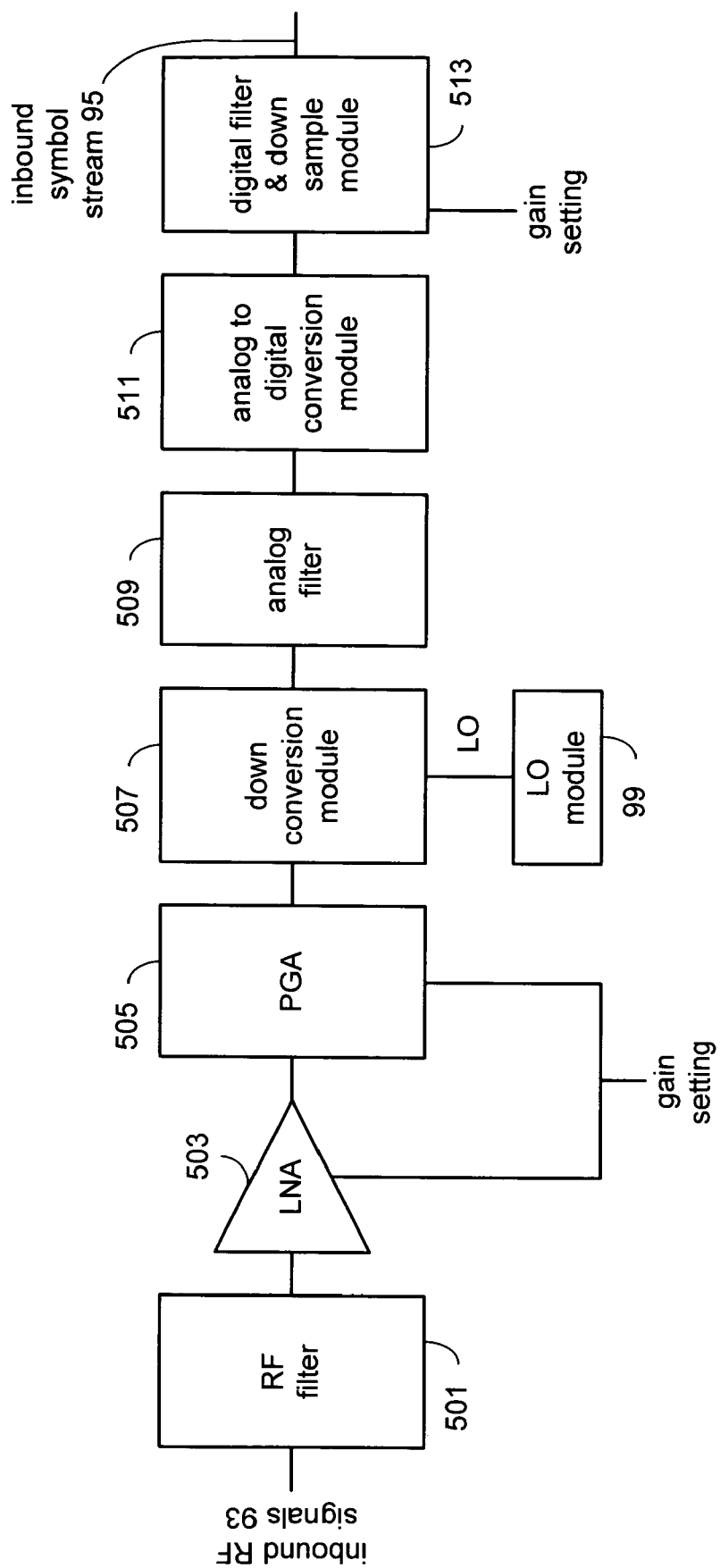
FIG. 5 is a schematic block diagram of an RF receiver in accordance with the present invention.

FIG. 5 is a schematic block diagram of each of the RF receivers 75, 77, 79. In this embodiment, each of the RF receivers includes an RF filter 501, a low noise amplifier (LNA) 503, a programmable gain amplifier (PGA) 505, a down-conversion module 507, an analog filter 509, an analog-to-digital conversion module 511 and a digital filter and down-sampling module 513. The RF filter 501, which may be a high frequency band-pass filter, receives the inbound RF signals 93 and filters them to produce filtered inbound RF signals. The low noise amplifier 503 amplifies the filtered inbound RF signals 93 based on a gain setting and provides the amplified signals to the programmable gain amplifier 505. The programmable gain amplifier further amplifies the inbound RF signals 93 before providing them to the down-conversion module 507.

The down-conversion module 507 includes a pair of mixers, a summation module, and a filter to mix the inbound RF signals with a local oscillation (LO) that is provided by the local oscillation module to produce analog baseband signals. The analog filter 509 filters the analog baseband signals and provides them to the analog-to-digital conversion module 511 which converts them into a digital signal. The digital filter and down-sampling module 513 filters the digital signals and then adjusts the sampling rate to produce the inbound symbol stream 95.

Figure 6:
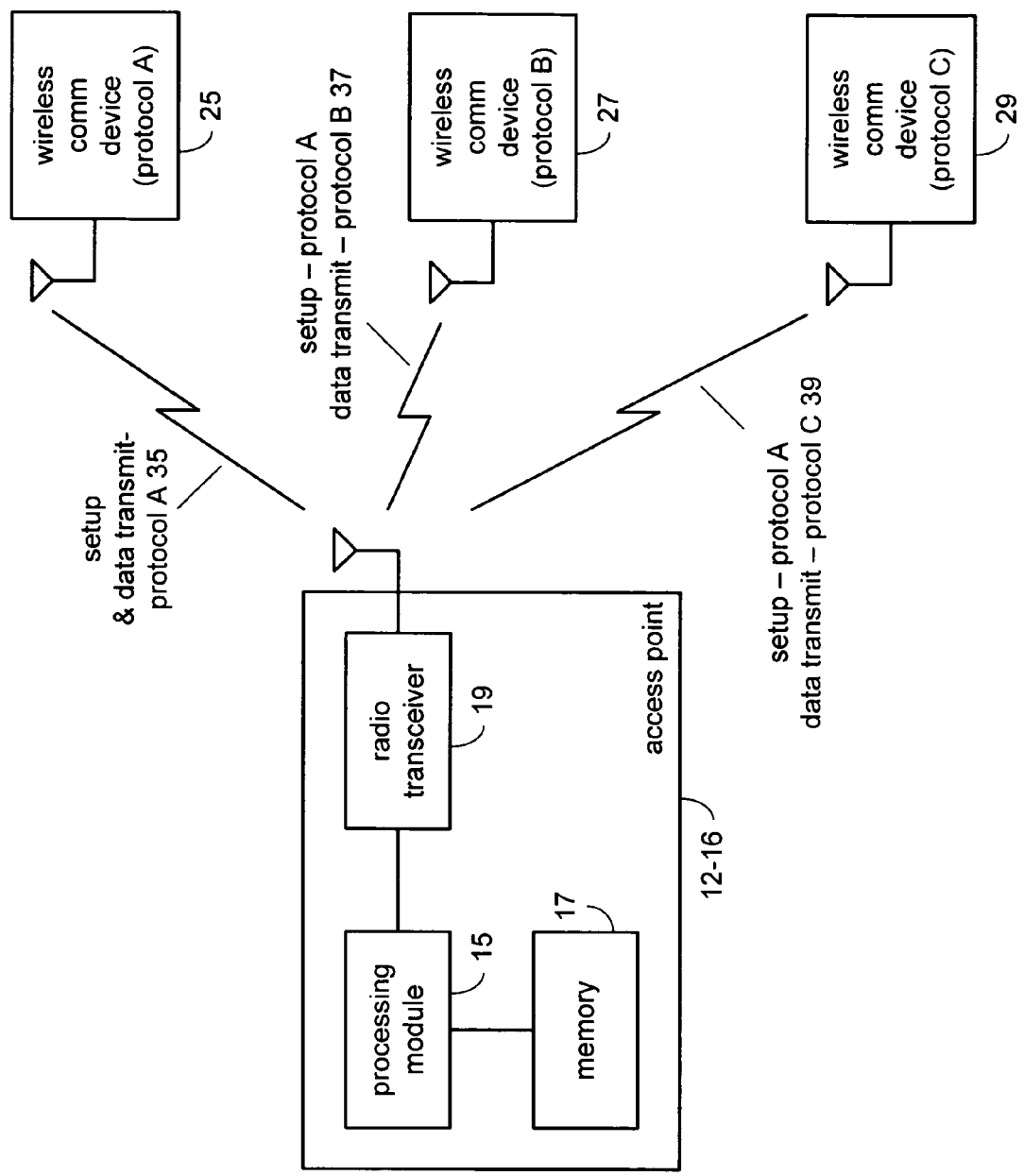
FIG. 6 is a schematic block diagram of an access point communicating with wireless communication devices in accordance with the present invention.

FIG. 6 is a schematic block diagram of an access point 12–16 communicating with wireless communication devices 25, 27 and/or 29. The wireless communication devices 25, 27 and/or 29 may be any one of the devices 18–32 illustrated in FIGS. 1–3. In this illustration, access point 12–16 includes a processing module 15, memory 17 and a radio transceiver 19. The radio transceiver 19 may be similar to the radio transceiver of each wireless communication device in architecture and may include a plurality of antennas, transmit paths and receive paths for multiple wireless communications within a proximal region or basic service set. The processing module 15 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 17 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 15 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 17 stores, and the processing module 15 executes, operational instructions corresponding to at least some of the steps and/or functions illustrated in FIGS. 7–21.

In this illustration, each of the wireless communication devices 25, 27 and 29 utilize a different wireless communication protocol. For example, wireless communication device 25 utilizes protocol A, wireless communication device 27 utilizes protocol B and wireless communication device 29 utilizes protocol C. For example, protocols A, B and C may correspond to three different versions of the IEEE 802.11 standard. For instance, protocol A may correspond to IEEE 802.11b, protocol B may correspond to IEEE 802.11g and protocol C may correspond to IEEE 802.11n.

The various protocols may be ordered based on the legacy of each of the corresponding protocols where the first protocol in the ordering is the oldest standard and the last entry in the protocol ordering is the most current standard. For example, in this present illustration protocol A may correspond to IEEE 802.11b, protocol B may correspond to IEEE 802.11g and protocol C may correspond to IEEE 802.11n. Alternatively, the protocol ordering may be based on a user defined and/or system administrator defined procedure. For instance, if an unacceptable number of transmission errors occur due to non-recognition of frames while utilizing protocol A to set-up wireless communications, the user may select the protocol B format for setting up a wireless communication. This concept will be described in greater detail with reference to the remaining figures.

In operation, the access point 12–16, and/or each of the wireless communication devices 25, 27 and 29, determine the protocol utilized by each of the wireless communication devices within the proximal region. Recall that the proximal region may include a basic service set and/or neighboring basic service sets and/or a direct, or ad-hoc network wherein the wireless communication devices communicate directly. Once the protocol of each of the wireless communication devices has been determined, the access point 12–16 and/or the wireless communication devices 25–29 determine, based on the protocol ordering, which protocol will be utilized to set-up a wireless communication. For instance, if protocol A corresponds to IEEE 802.11b, the communication devices will utilize a MAC level protection mechanism to set-up a wireless communication, as will be further described with reference to FIG. 11. As such, each of the wireless communication devices will utilize protocol A to set-up, or establish, a wireless communication such that the legacy devices recognize that a wireless communication is being set-up and also recognizes the duration of that wireless communication such that it will not transmit during that time, thus avoiding a collision.

Once the wireless communication is established, or set-up, utilizing a selected protocol (e.g., protocol A) from the protocol ordering, the communication device then utilizes its protocol to transmit the data for the remainder of the wireless communication. For example, wireless communication device 25 will utilize protocol A to establish and to transmit data for a wireless communication 35. Wireless communication device 27 will utilize protocol A to set-up a wireless communication and then use protocol B for the corresponding data transmission of the wireless communication 37. Similarly, wireless communication device 29 will utilize protocol A to establish, or set-up, the wireless communication and then use protocol C for the data transmission portion of the wireless communication 39.

As one of average skill in the art will appreciate, if the proximal region only includes wireless communication devices that utilize the same protocol, the set-up and data transmission is done using that protocol. As one of average skill in the art will further appreciate, if only two different protocols are present within the proximal region, the legacy protocol will be selected as the set-up protocol.

Figure 7:
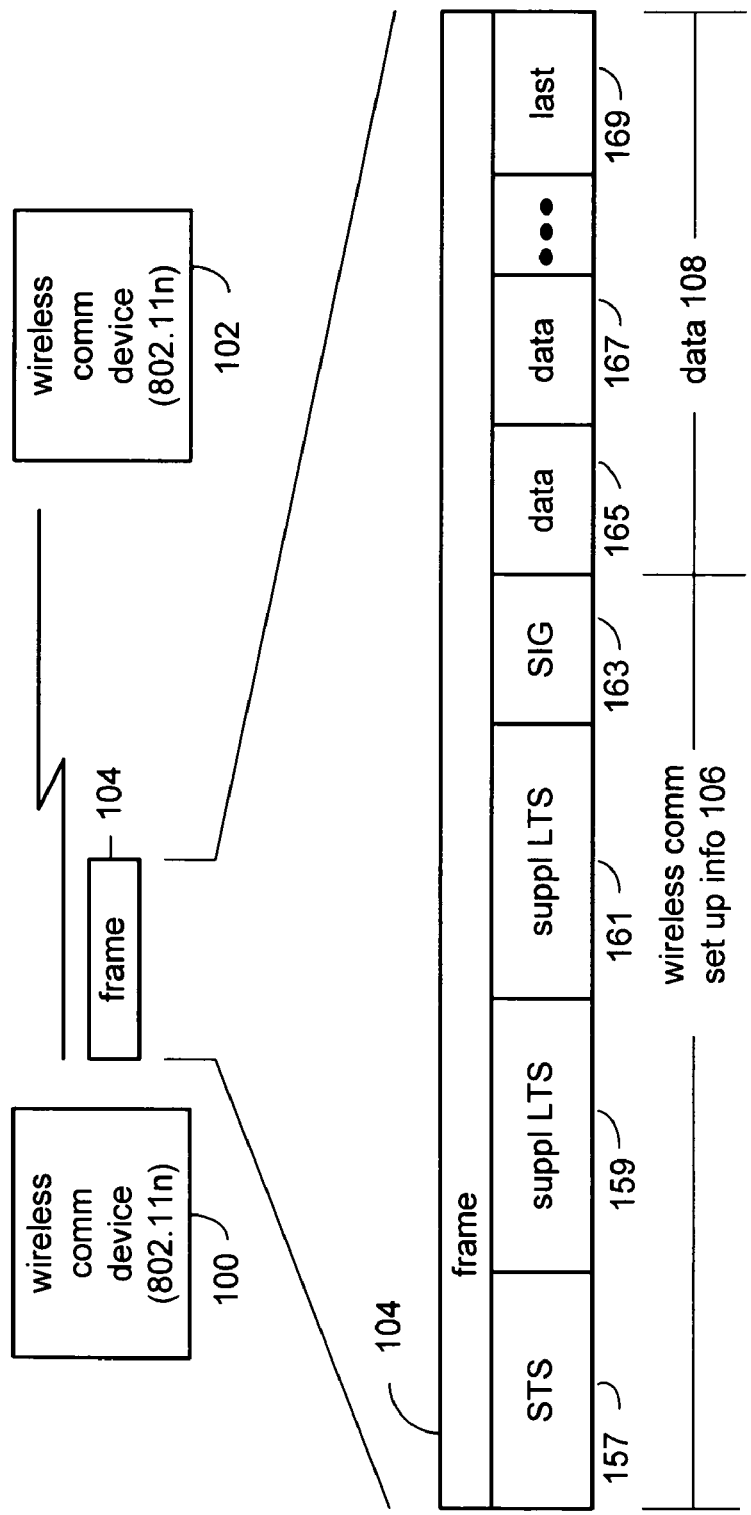
FIG. 7 is a diagram depicting one type of wireless communication in accordance with the present invention.

FIG. 7 is a diagram depicting a wireless communication between two wireless communication devices 100 and 102 that are in a proximal region where the only protocol that is used is IEEE 802.11n. The wireless communication may be direct (i.e., from wireless communication device to wireless communication device), or indirect (i.e., from a wireless communication device to an access point to a wireless communication device). In this example, wireless communication device 100 is providing frame 104 to wireless communication device 102. The frame 104 includes a wireless communication set-up information field 106 and a data portion 108. The wireless communication set-up information portion 106 includes a short training sequence 157 that may be 8 microseconds long, a $1^{st}$ supplemental long training sequence 159 that may be 4 microseconds long, which is one of a plurality of supplemental long training sequences 161, and a signal field 163 that may be 4 microseconds long. Note that the number of supplemental long training sequences 159, 161 will correspond to the number of transmit antennas being utilized for multiple input multiple output radio communications.

The data portion of the frame 104 includes a plurality of data symbols 165, 167, 169 each being 4 microseconds in duration. The last data symbol 169 also includes a tail bits and padding bits as needed.

Figure 8:
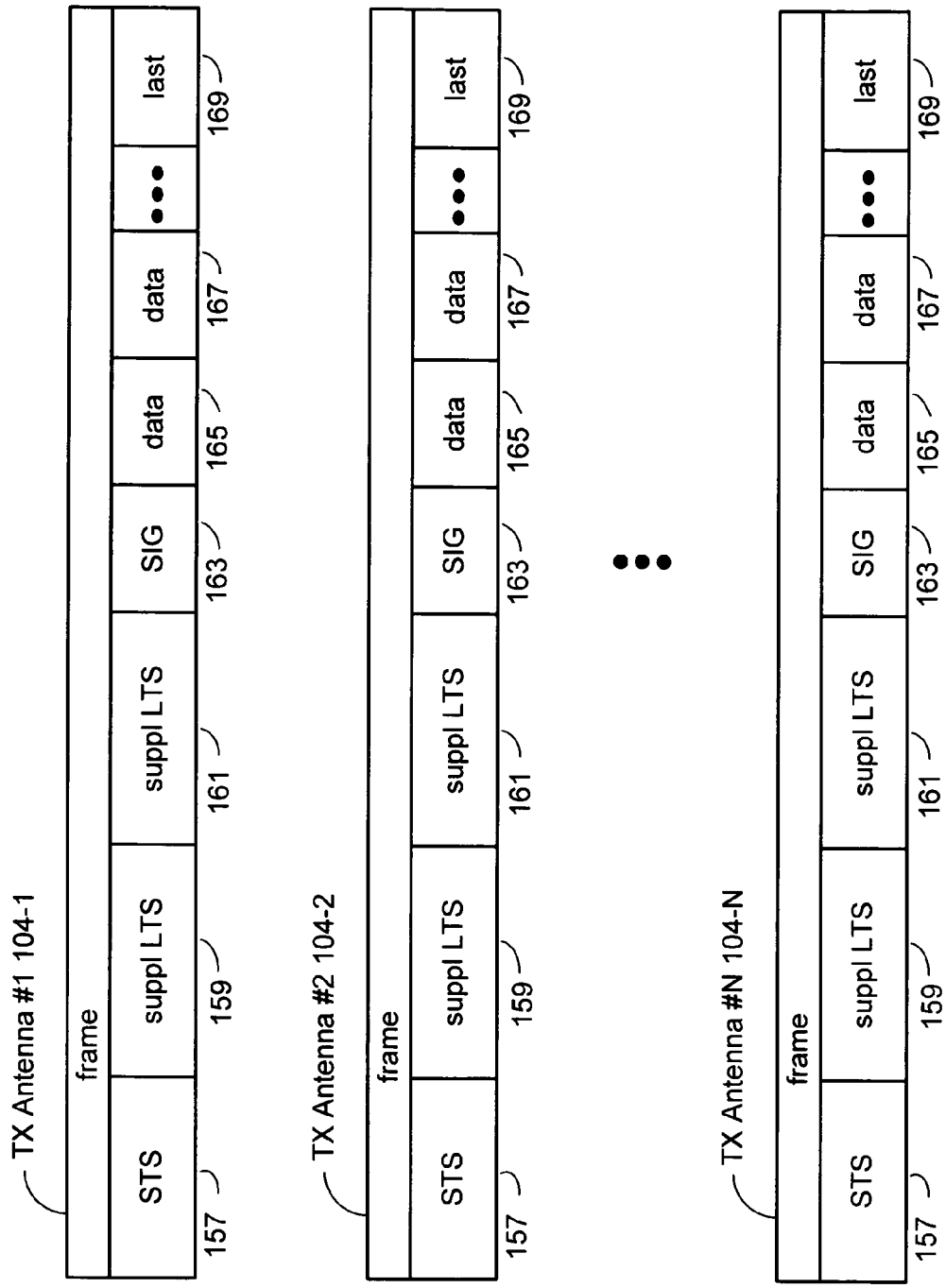
FIG. 8 is a diagram depicting one type of MIMO wireless communication in accordance with the present invention.

FIG. 8 is a diagram depicting a wireless communication between two wireless communication devices 100 and 102 that are in a proximal region where the only protocol that is used is IEEE 802.11n. The wireless communication may be direct (i.e., from wireless communication device to wireless communication device), or indirect (i.e., from a wireless communication device to an access point to a wireless communication device). In this example, wireless communication device 100 is providing multiple frames 104-1, 104-2, 104-N to wireless communication device 102 using multiple antennas #1–#N. Each of the frames 104-1, 104-2, 104-N includes a wireless communication set-up information field 106 and a data portion 108. The wireless communication set-up information portion 106 includes a short training sequence 157 that may be 8 microseconds long, a $1^{st}$ supplemental long training sequence 159 that may be 4 microseconds long, which is one of a plurality of supplemental long training sequences 161, and a signal field 163 that may be 4 microseconds long. Note that the number of supplemental long training sequences will correspond to the number of transmit antennas being utilized for multiple input multiple output radio communications.

The data portion of the frame 104 includes a plurality of data symbols 165, 167, 169 each being 4 microseconds in duration. The last data symbol 169 also includes a tail bits and padding bits as needed.

In this instance, the preamble (sometimes referred to as "Greenfield") is for the case when only .11n devices are present. Alternatively, it may be used with legacy devices (.11,.11a,.11b, and .11g) when MAC level protection (RTS/CTS or CTS to self) is employed. (MAC level protection may also be used when legacy stations are not present to protect very long bursts.)

The short training sequence 157 may be the same as 802.11a for TX antenna 1. For antennas 2 to N, it is a cyclic shifted version of the same sequence. In the preferred mode, the amount of cyclic shift per antenna is computed from (Antenna number−1)*800/N in nanoseconds for antenna 2. That is for 1 antenna the shift is zero. For 2 antennas, the shift is 0 ns for antenna 1 and 400 ns. For 3 antennas, the shifts are 0, 250, and 500 ns. For 4 antennas, the shifts are 0, 200, 400, and 600 ns. The implementation is most straightforward when the shifts are rounded to units of 50 ns (the inverse of the symbol clock frequency). Shifts may be implemented in either a forward or backward direction.

There are several possible implementations of the supplemental long training sequences 159, 161: (m=1) For this case, there will only be one long training sequence 159. For antenna 1, it will be the same as the 802.11a long training sequence 159 but only 4 microseconds long, including a 0.8 microsecond guard interval. For antennas 2 to N it is a cyclic shifted version of the same sequence. In the preferred mode, the amount of cyclic shift per antenna is computed from (Antenna number−1)*4/N in microseconds. That is for 1 antenna the shift is zero. For 2 antennas, the shift is 0 ns for antenna 1 and 4 us. For 3 antennas, the shifts are 0, 2.65 us, 5.35 us. For 4 antennas, the shifts are 0, 2, 4, and 6 microseconds. Once again, the implementation is most straightforward when the shifts are rounded to units of 50 ns (the inverse of the symbol clock frequency). Shifts may be implemented in either a forward or backward direction.

For (m=N), the number of training sequences is equal to the number of transmit antennas. This is preferable to the (m=1) case because it will lead to less channel estimation error at the receiver, especially for large numbers of antennas. Thus, it is scalable. There are two possible choices of training sequence:

Zero space—In this case, sequences (1,1), (2,2), (3,3), . . . up to (N,N) are the same as the 802.11a long training sequence. All others (i.e. (1,2), (2,1), etc) are null—nothing is transmitted during that time slot.)

Subchannel null—In this case, the set of sub-channels in the training sequences is sub-divided by the number of transmit antennas. Individual subsets are activated on each sub-training interval.

Orthogonal sequences that are generated by multiplying the subcarriers of the 802.11a long training sequence by an m×m orthonormal matrix, such as the matrix, which generates a discrete Fourier transform.

Figure 9:
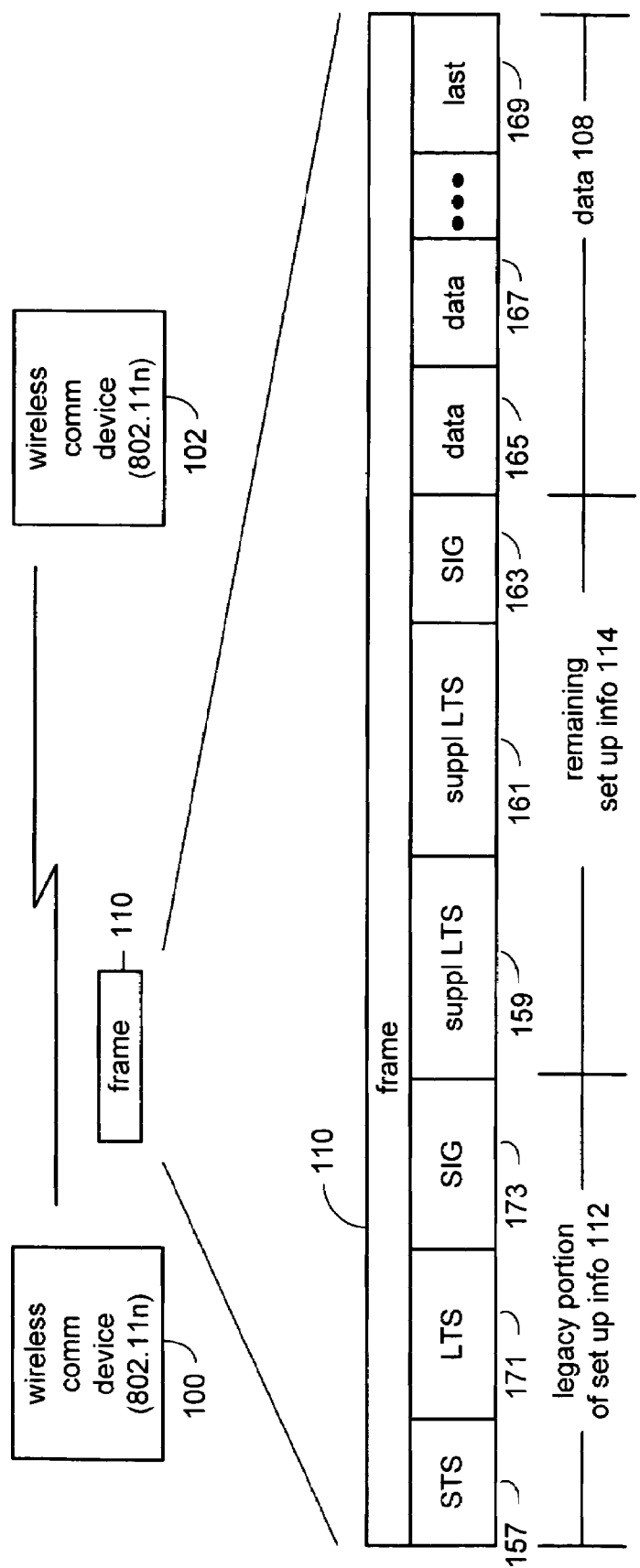
FIG. 9 is a diagram depicting another type of wireless communication in accordance with the present invention.

FIG. 9 is a diagram of a wireless communication between two wireless communication devices 100 and 102, each of which is compliant with IEEE 802.11n. Such a communication is taking place within a proximal area that includes 802.11n compliant devices, 802.11a compliant devices and/or 802.11g compliant devices. In this instance, the wireless communication may be direct or indirect where a frame 110 includes a legacy portion of the set-up information 112, remaining set-up information portion 114, and the data portion 108.

The legacy portion of the set-up information 112 includes a short training sequence 157, which is 8 microseconds in duration, a long training sequence 171, which is 8 microseconds in duration, and a signal field 173, which is 4 microseconds in duration. The signal field 173, as is known, includes several bits to indicate the duration of the frame 110. As such, the IEEE 802.11a compliant devices within the proximal area and the 802.11g compliant devices within the proximal area will recognize that a frame is being transmitted even though such devices will not be able to interpret the remaining portion of the frame. In this instance, the legacy devices (IEEE 802.11a and IEEE 802.11g) will avoid a collision with the IEEE 802.11n communication based on a proper interpretation of the legacy portion of the set-up information 112.

The remaining set-up information 114 includes additional supplemental long training sequences 159, 161, which are each 4 microseconds in duration. The remaining set-up information further includes a high data signal field 163, which is 4 microseconds in duration to provide additional information regarding the frame. The data portion 108 includes the data symbols 165, 167, 169, which are 4 microseconds in duration as previously described with reference to FIG. 7. In this instance, the legacy protection is provided at the physical layer.

Figure 10:
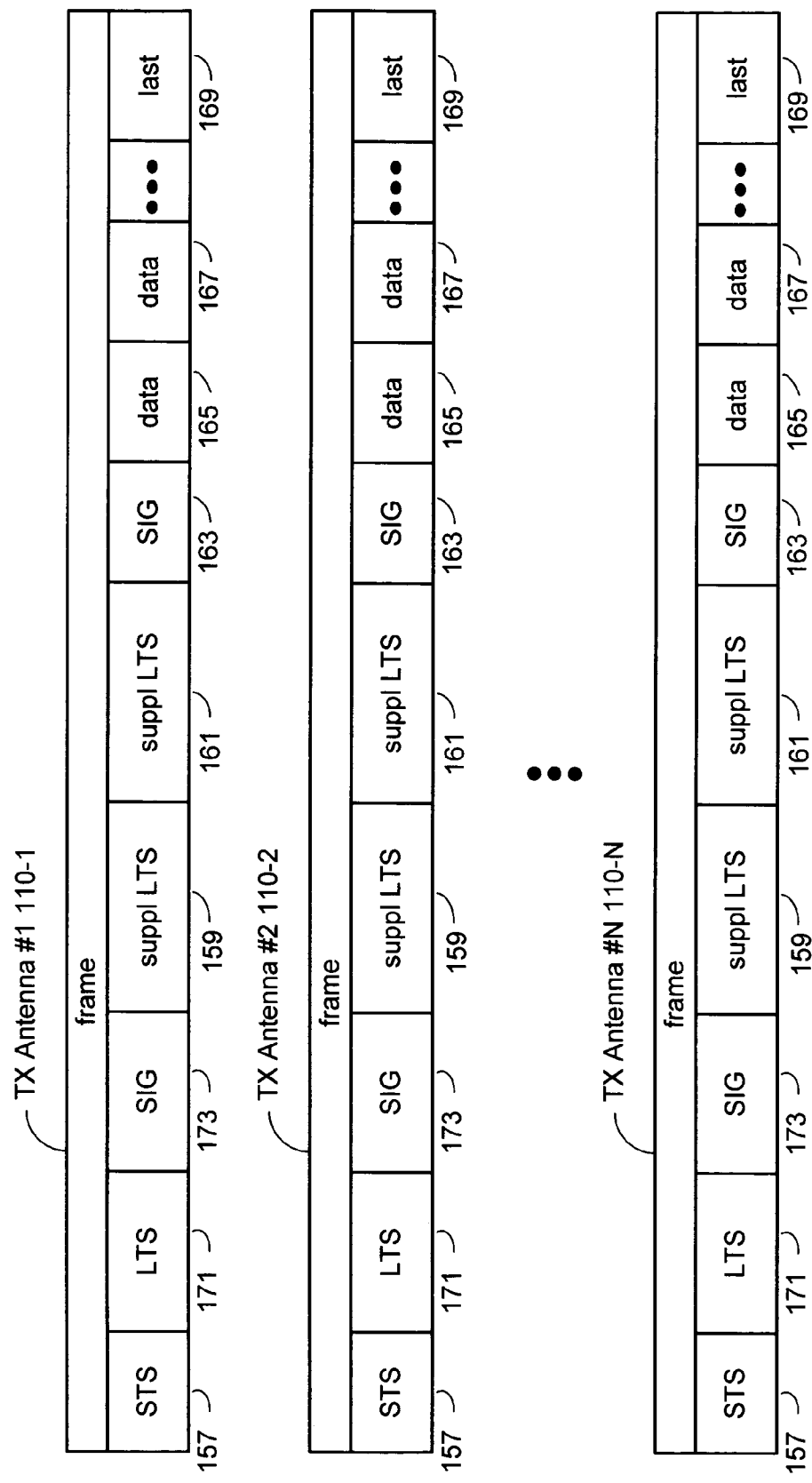
FIG. 10 is a diagram depicting another type of MIMO wireless communication in accordance with the present invention.

FIG. 10 is a diagram of a wireless communication between two wireless communication devices 100 and 102, each of which is compliant with IEEE 802.11n. Such a communication is taking place within a proximal area that includes 802.11n compliant devices, 802.11a compliant devices and/or 802.11g compliant devices. In this instance, the wireless communication may be direct or indirect where frames 110-1, 110-2, 110-N each includes a legacy portion of the set-up information 112, remaining set-up information portion 114, and the data portion 108 using multiple antennas.

The legacy portion of the set-up information 112 includes a short training sequence 157, which is 8 microseconds in duration, a long training sequence 171, which is 8 microseconds in duration, and a signal field 173, which is 4 microseconds in duration. The signal field 173, as is known, includes several bits to indicate the duration of the frame 110. As such, the IEEE 802.11a compliant devices within the proximal area and the 802.11g compliant devices within the proximal area will recognize that a frame is being transmitted even though such devices will not be able to interpret the remaining portion of the frame. In this instance, the legacy devices (IEEE 802.11a and IEEE 802.11g) will avoid a collision with the IEEE 802.11n communication based on a proper interpretation of the legacy portion of the set-up information 112.

The remaining set-up information 114 includes additional supplemental long training sequences 159, 161, which are each 4 microseconds in duration. The remaining set-up information further includes a high data signal field 163, which is 4 microseconds in duration to provide additional information regarding the frame. The data portion 108 includes the data symbols 165, 167, 169, which are 4 microseconds in duration as previously described with reference to FIG. 7. In this instance, the legacy protection is provided at the physical layer.

In one embodiment, m is the number of longer training sequences per frame, N is the number of transmit antennas, the preamble (sometimes referred to as "Brownfield") is for the case when .11a or .11g legacy devices present. The short training and long training sequences are the same as 802.11a for TX antenna 1. For antennas 2 to N there are two possibilities:

Use a cyclic shifted version of the same sequence. The amount of cyclic shift per antenna is computed from (Antenna number−1)*800/N in nanoseconds for the short training and (Antenna number−1)*4/N in microseconds.

A second mode is to leave the short training through signal field parts transmitted on antennas 2 to N as null. (i.e. these antennas do not transmit during this interval.) Furthermore, supplemental long training sequences from antenna 1 are not used and nothing is transmitted during this time.

The signal field 173 will follow the same format as 802.11a, except the reserved bit (4) will be set to 1 to indicate an 802.11n frame and subsequent training for .11n receivers. The supplemental training long training sequences can be defined in multiple ways:

(m=1) For this case, there will only be one long supplemental training sequence 159. It will be orthogonal to the 802.11a long training sequence.

(m=N−1) For this case, the number of training sequences is equal to the number of transmit antennas. This is preferable to the (m=1) case because it will lead to less channel estimation error at the receiver, especially for large numbers of antennas. Thus, it is scalable.

There are three possible choices of training sequence:

Zero space—In this case, sequences (1,1), (2,2), (3,3), . . . up to (m,m) are the same as the 802.11a long training sequence. All others (i.e. (1,2), (2,1), etc) are null—nothing is transmitted during that time slot.)

Subchannel null—In this case, the set of sub-channels in the training sequences is sub-divided by the number of transmit antennas. Individual subsets are activated on each sub-training interval.

One embodiment uses Orthogonal sequences that are generated by multiplying the 802.11a long training sequence by an m×m orthonormal matrix, such as the matrix which generates a discrete Fourier transform, as will be described in greater detail with reference to FIGS. 18–21. For example, the 4 antenna case would employ the following orthonormal matrix to generate the subcarriers for each supplemental long training sequence.

$$S_k = \begin{bmatrix} s_{10,k} & s_{11,k} & s_{12,k} \\ s_{20,k} & s_{21,k} & s_{22,k} \\ s_{30,k} & s_{31,k} & s_{32,k} \end{bmatrix} = \begin{bmatrix} s_{00,k} & s_{00,k} \cdot e^{i \cdot \theta_k} & s_{00,k} \cdot e^{i \cdot \theta_k} \\ s_{00,k} & s_{00,k} \cdot e^{i(\theta_k - \frac{4\pi}{3})} & s_{00,k} \cdot e^{i(\theta_k - \frac{2\pi}{3})} \\ s_{00,k} & s_{00,k} \cdot e^{i(\theta_k - \frac{2\pi}{3})} & s_{00,k} \cdot e^{i(\theta_k - \frac{4\pi}{3})} \end{bmatrix}$$

$$\theta_k = \pi \cdot k / (4 \cdot N_{subcarriers})$$

$$\phi_k = \pi \cdot (k+4) / (2 \cdot N_{subcarriers})$$

Figure 11:
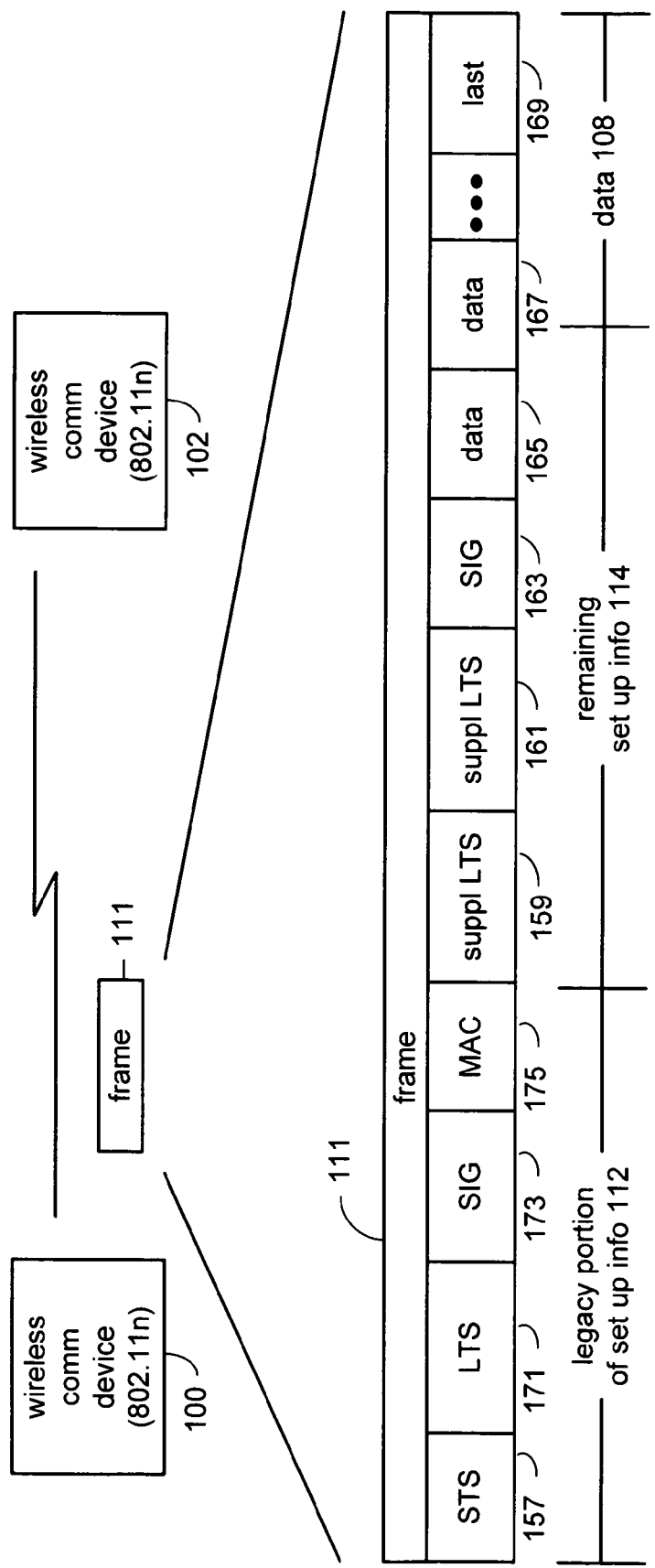
FIG. 11 is a diagram of yet another wireless communication in accordance with the present invention.

FIG. 11 is a diagram of a wireless communication between two wireless communication devices 100 and 102 that are both IEEE 802.11n compliant. The wireless communication may be direct or indirect within a proximal area that includes IEEE 802.11 compliant devices, IEEE 802.11a, 802.11b and/or 802.11g devices. In this instance, the frame 111 includes a legacy portion of the set-up information 112, remaining set-up information 114 and the data portion 108. As shown, the legacy portion of the set-up information 112, or legacy frame, includes an IEEE 802.11 PHY preamble (i.e., STS 157, LTS 171, and signal field 173) and a MAC partitioning frame portion 175, which indicates the particulars of this particular frame that may be interpreted by legacy devices. In this instance, the legacy protection is provided at the MAC layer.

The remaining set-up information 114 includes a plurality of supplemental long training sequences 159, 161 and the high data signal field 163. The data portion 108 includes a plurality of data symbols 165, 167, 169 as previously described.

Figure 12:
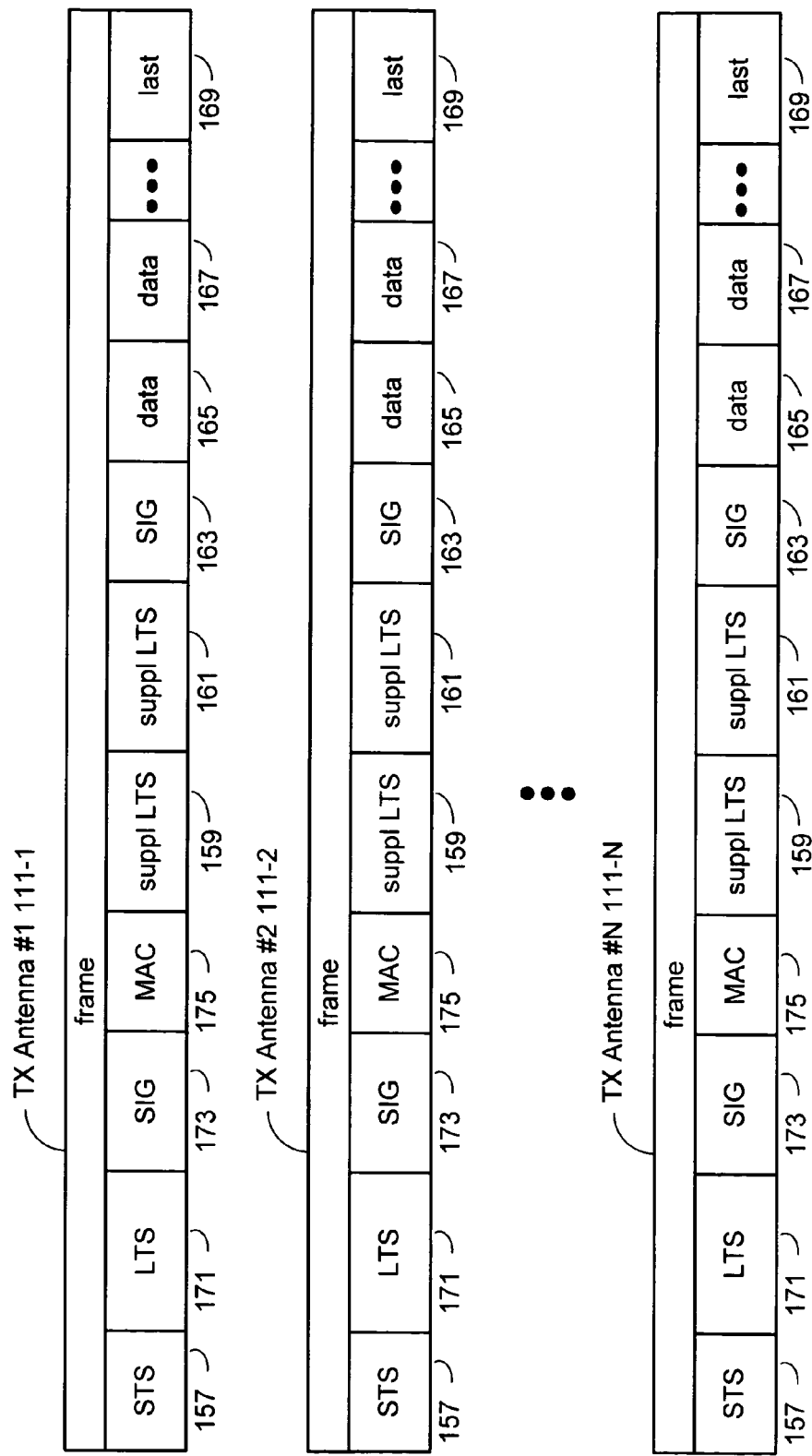
FIG. 12 is a diagram of yet another MIMO wireless communication in accordance with the present invention.

FIG. 12 is a diagram of a wireless communication between two wireless communication devices 100 and 102 that are both IEEE 802.11n compliant using multiple antennas. The wireless communication may be direct or indirect within a proximal area that includes IEEE 802.11 compliant devices, IEEE 802.11a, 802.11b and/or 802.11g devices. In this instance, each of the frames 111-1, 111-2, 111-N includes a legacy portion of the set-up information 112, remaining set-up information 114 and the data portion 108. As shown, the legacy portion of the set-up information 112, or legacy frame, includes an IEEE 802.11 PHY preamble (i.e., STS 157, LTS 171, and signal field 173) and a MAC partitioning frame portion 175, which indicates the particulars of this particular frame that may be interpreted by legacy devices. In this instance, the legacy protection is provided at the MAC layer. Note that the fields follow the same structure as for FIGS. 9 and 10 described above, with the exception of the signal field. This is an alternative that uses MAC partitioning to set the NAV of legacy stations. The MAC partitioning segment contains frame information, coded at a legacy rate to allow reception by .11a and .11g stations. The definitions of the supplemental long training symbols 159, 161 follows the same format as in FIGS. 9 and 10.

The remaining set-up information 114 includes a plurality of supplemental long training sequences 159, 161 and the high data service field 163. The data portion 108 includes a plurality of data symbols 165, 167, 169 as previously described.

Figure 13:
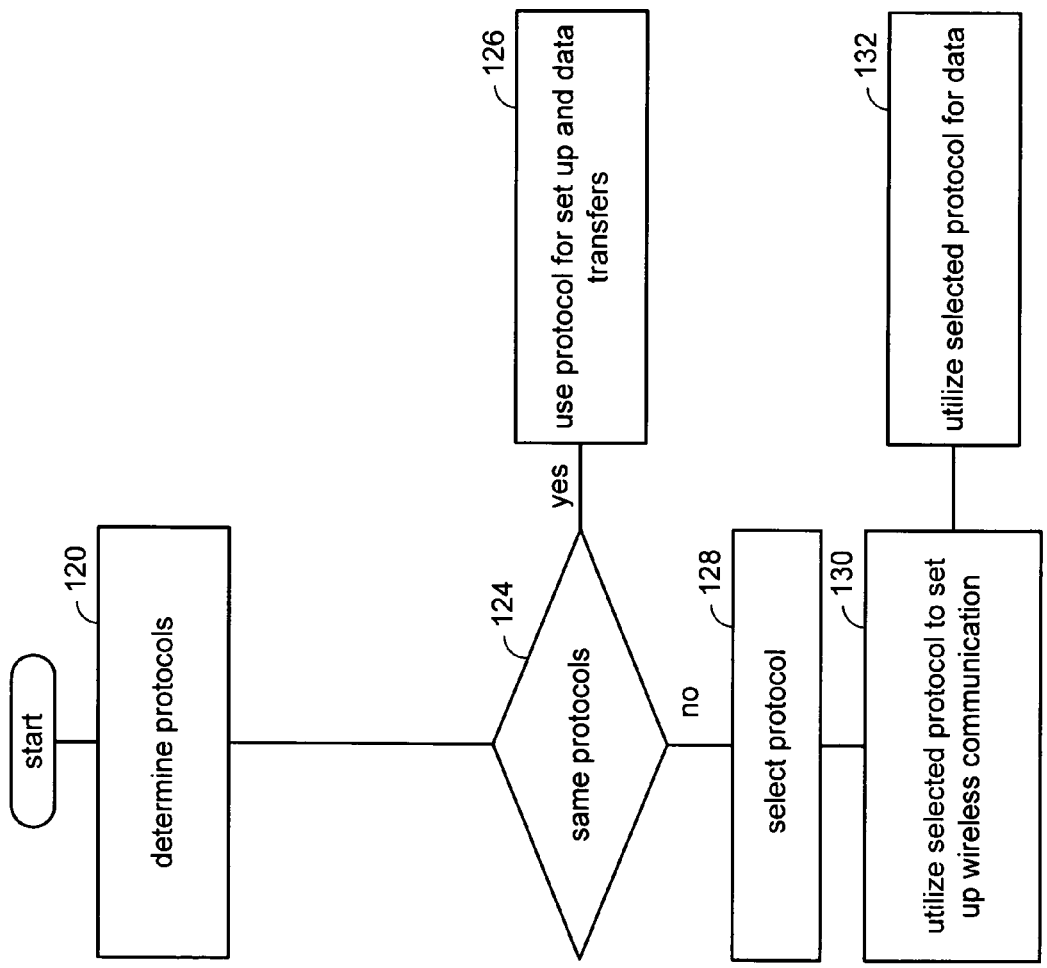
FIG. 13 is a logic diagram of a method for multiple protocol communications in accordance with the present invention.

FIG. 13 is a method for multiple protocol wireless communications in a WLAN. The method begins at step 120, where an access point (for indirect wireless communications) or a wireless communication device (for direct wireless communications), determines protocols of wireless communication devices within a proximal region. In an embodiment, the protocols may be determined based on frequency band of use and wireless local area network communication format of each of the wireless communication devices. For example, if the frequency band is 2.4 GHz, a device may have a WLAN communication format in accordance with IEEE 802.11b, IEEE 802.11g, and/or IEEE 802.11n. If the frequency band is 4.9–5.85 GHz, a device may have a WLAN communication format in accordance with IEEE 802.11a or IEEE 802.11n. Further, the proximal region includes coverage area of a basic service set, coverage area of an ad-hoc network, and/or coverage area of the basic service set and at least a portion of at least one neighboring basic service set. With reference to FIG. 1, neighboring BSS of access point 12 include the BSS of access point 14 and/or the BSS of access point 16.

Returning to the logic diagram of FIG. 13, the process continues at step 122 where the access point and/or the wireless communication device determines whether the protocols of the wireless communication devices within the proximal region are of a like protocol. The process then proceeds to step 124 where the process branches depending on whether the protocols of the wireless communication devices within the proximal region are of a like protocol. When the wireless communication devices within the proximal region all use the same protocol, the process proceeds to step 126 where the wireless communication devices use their protocol for setting up a wireless communication and for the wireless communication.

If, however, at least one wireless communication device has a different protocol, the process proceeds to step 128 where the access point or a wireless communication device selects a protocol of the protocols of the wireless communication devices within the proximal region based on a protocol ordering to produce a selected protocol. The protocol ordering may be an ordering of the protocols based on legacy ordering of wireless communication devices and/or an ordering of the protocols based on a transmission efficiency ordering of the protocols. For example, IEEE 802.11, IEEE 802.11b, IEEE 802.11g, and IEEE 802.11n compliant devices operate in the 2.4 GHz frequency band and IEEE 802.11a and IEEE 802.11n compliant devices operate in the 4.9–5.85 GHz frequency band. Thus, in the 2.4 GHz frequency band, if 802.11b stations are present with 802.11n device, MAC level protection mechanisms, such as those defined in 802.11g, and as shown in FIG. 6, may be used. However, if the only legacy 802.11g devices are present with 802.11n devices, then either MAC level (e.g., FIG. 6) or PHY level (e.g., FIG. 5) protection mechanisms may be used. In the 4.9–5.85 GHz frequency band, if 802.11a devices are present with 802.11n devices, the MAC level protection mechanism or the PHY level protection mechanism may be used.

As one of average skill in the art will appreciate, it may be more desirable to use a PHY level protection mechanism, than a MAC level protection mechanism because the throughput impact will be less since the additional frames of the MAC level protection are not needed. Thus, when possible, the PHY mechanism should be employed first. If the PHY mechanism does not work well, as measured by the number of unacknowledged frames exceeding a threshold, then the MAC level mechanism should be employed.

As one of average skill in the art will further appreciate, the legacy status and required use of protection mechanisms can be enabled in the ERP Information Element of the beacon frame (and probe response frame). Currently 802.11g uses bits 0 to indicate Non-ERP (i.e. .11b) present and bit 1 to force stations to Use Protection (MAC level). This can be extended to used the reserved bits (3 through 7) to indicate legacy status of .11g or .11a stations. In one embodiment, bit 3 may be used to indicated "Legacy OFDM present". The bits would then be interpreted as follows:

| Bit 0 - Non ERP Present | Bit 1 - Use Protection | Bit 3 - Legacy OFDM Present | Action for 802.11n |
|---|---|---|---|
| 0 | 0 | 0 | Use .11n frames |
| 1 | 1 | 0 | Use MAC protection |
| 1 | 1 | 1 | Use MAC protection |
| 0 | 1 | 1 | Use PHY or MAC protection |
| 0 | 0 | 1 | Optionally use PHY or MAC Protection |

For .11n the MAC level protection mechanisms are the same as for .11g. Stations should either use CTS to self or a CTS/RTS exchange to set the NAV (network allocation vector) of legacy stations.

Returning the logic diagram of FIG. 13, the processing continues at step 130 where the wireless communication device utilizes the selected protocol within the proximal region to set up a wireless communication within the proximal region. This was illustrated in FIGS. 6–12. The process then proceeds to step 132 where the wireless communication device uses its protocol for a data transmission of the wireless communication.

Figure 14:
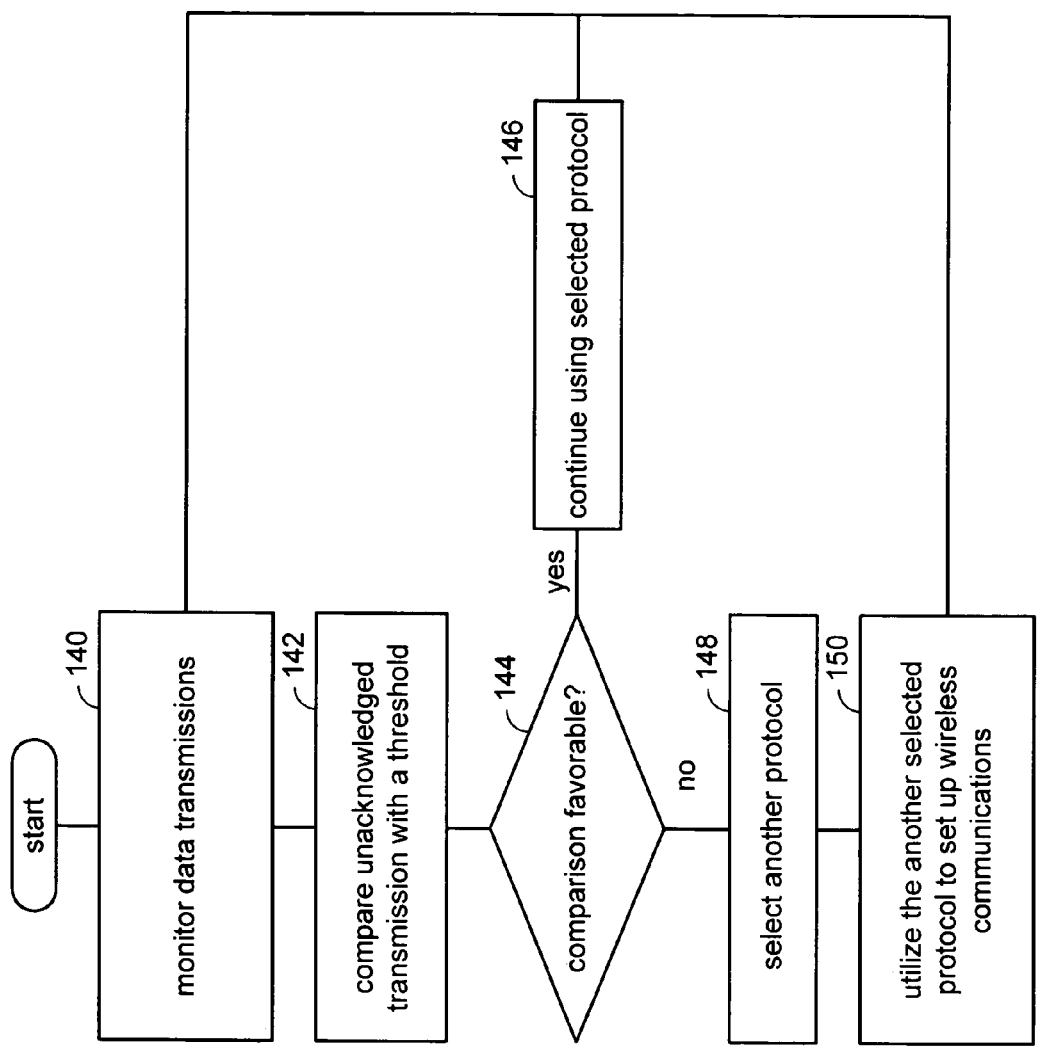
FIG. 14 is a logic diagram of a method for monitoring success of wireless multiple protocol communications in accordance with the present invention.

FIG. 14 is a logic diagram of method for determining whether the selected protocol should be changed. The processing begins at step 140 where the access point and/or the wireless communication devices, monitors data transmissions within the proximal region for unacknowledged data transmissions. The process proceeds to step 142 where the access point and/or the wireless communication device compares the unacknowledged data transmission with a transmission failure threshold (e.g., up to 5%). If the comparison is favorable, the process proceeds to step 146 where the selected protocol remains unchanged and the process repeats at step 140.

If, however, the comparison at step 144 was unfavorable, the process proceeds to step 148 where the access point and/or the wireless communication device selects another one of the protocols of the wireless communication devices within the proximal region based on the protocol ordering to produce another selected protocol. For example, the MAC layer protection mechanism may be selected to replace the PHY layer protection mechanism when too many transmission failures occur. The process then proceeds to step 150 where the wireless communication devices uses the another selected protocol within the proximal region to set up the wireless communication within the proximal region.

Figure 15:
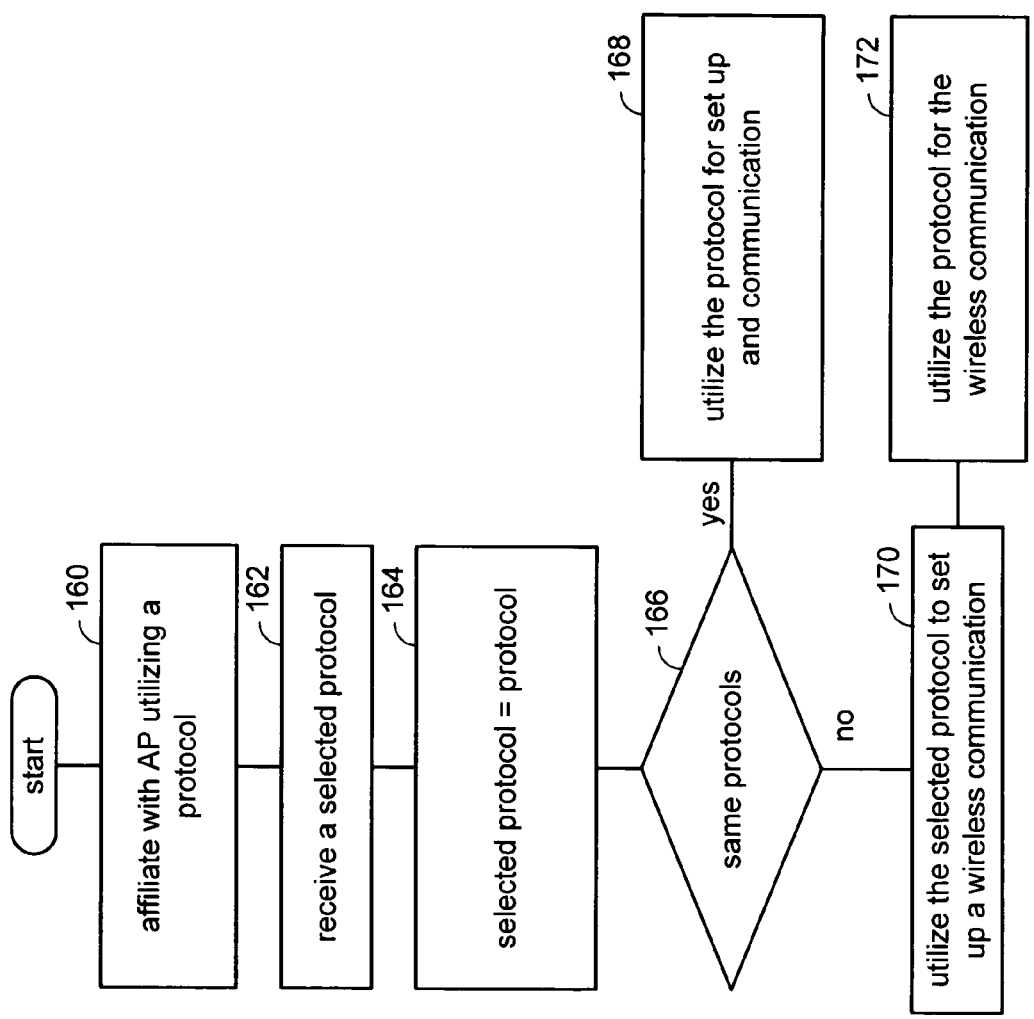
FIG. 15 is a logic diagram of a method for a wireless communication device to participate in a multiple protocol communication in accordance with the present invention.

FIG. 15 is a logic diagram of a method for a wireless communication device to participate in multiple protocol wireless communications. The process begins at step 160 where the wireless communication device affiliates with an access point utilizing a protocol (e.g., IEEE 802.11n) of the wireless communication device. The process then proceeds to step 162 where the wireless communication device receives a selected protocol from the access point. Note that the selected protocol and the protocol of the wireless communication device may be a wireless local area network communication formats in accordance with IEEE 802.11, IEEE 802.11a, IEEE 802.11b, IEEE 802.11g, IEEE 802.11n and/or further versions of the IEEE 802.11. Further note that the selected protocol includes a first frame format that includes a legacy header and a Media-Specific Access Control (MAC) layer partitioning field, a second frame format that includes a physical (PHY) layer backward compatible header, and/or a third frame format that includes a current version header and the MAC layer partitioning field.

The process then proceeds to step 164 where the wireless communication device determines whether the selected protocol and the protocol of the wireless communication device are of a like protocol. The process branches at step 166 to step 168 when the protocols are the same and to step 170 when the protocols are not the same. At step 168, the wireless communication device utilizes the protocol to set up a wireless communication and to transfer data. At step 170, the wireless communication device utilizes the selected protocol to set up a wireless communication. The process then proceeds to step 172 where the wireless communication device utilizes the protocol of the wireless communication device for the wireless communication.

Figure 16:
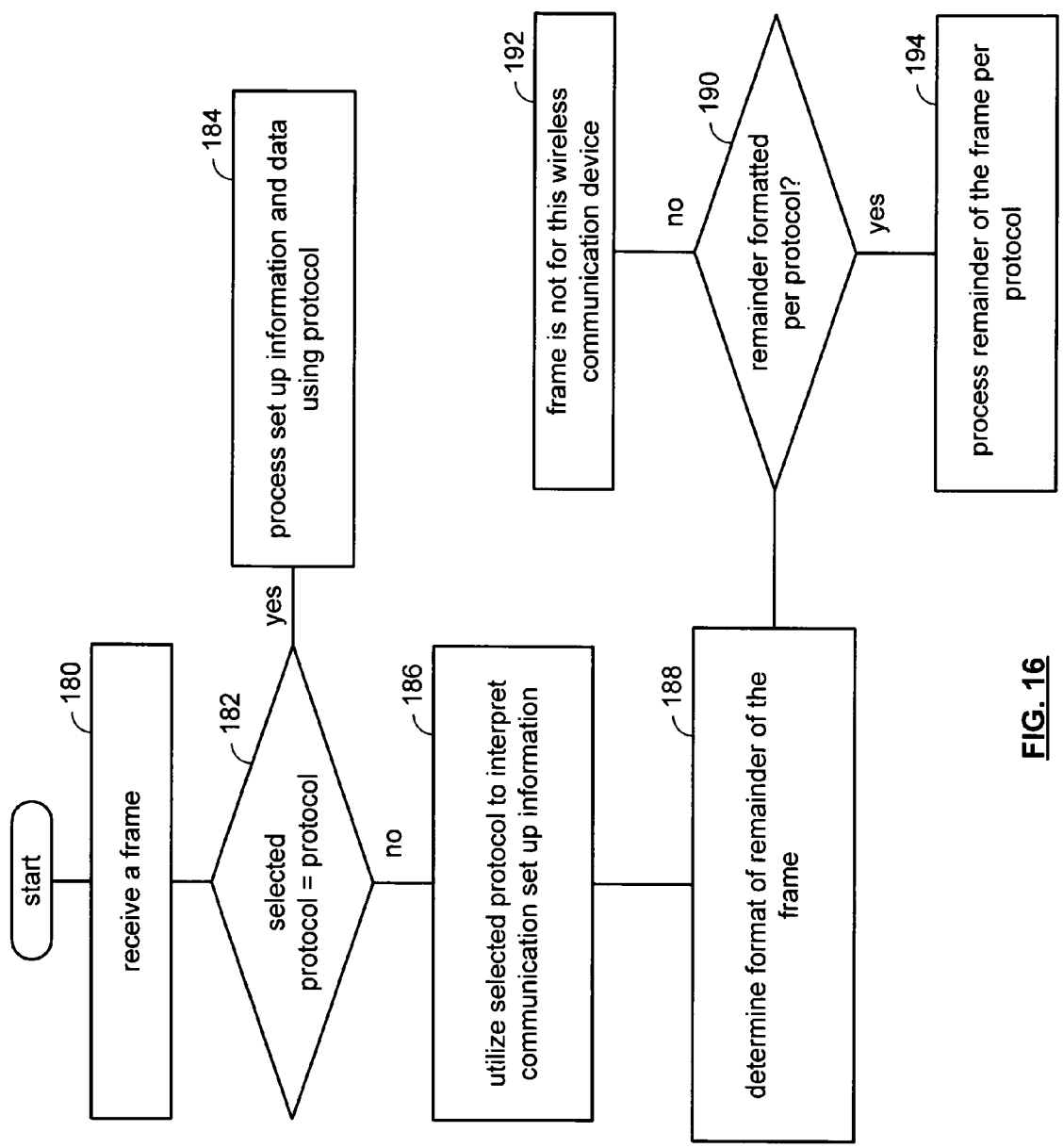
FIG. 16 is a logic diagram of another method for a wireless communication device to participate in a multiple protocol communication in accordance with the present invention.

FIG. 16 is a logic diagram of a method for a wireless communication device to participate in multiple protocol wireless communications. The process begins at step 180 where the wireless communication device receives a frame via a wireless channel. The process then proceeds to step 182 where the wireless communication device determines whether a selected protocol is not of a like protocol of the wireless communication device. When the selected protocol is the same as the protocol of the wireless communication device, the process proceeds to step 184 where the wireless communication device uses its protocol to set up a wireless communication and to transmit data.

If, however, the selected protocol is not the same as the protocol of the wireless communication device, the process proceeds to step 186 where the wireless communication device uses the selected protocol to interpret at least a portion of wireless communication set up information of the frame. In one embodiment, the wireless communication device may interpret the set up information by interpreting a header of the frame for conformity with a legacy physical layer format to provide the interpreting of the at least a portion of the wireless communication set up information and, when the header of the frame does not conform with the legacy physical layer format, determining that the remainder of the frame is formatted in accordance with the protocol of the wireless communication device. Note that the legacy physical layer format includes at least one of IEEE 802.11a and IEEE 802.11g and wherein the protocol of the wireless communication device includes IEEE 802.11n.

In another embodiment, the wireless communication device may interpret the set up information by interpreting the frame for conformity with a legacy Media Access Control (MAC) layer format to provide the interpreting of the at least a portion of the wireless communication set up information and, when the header of the frame does not conform with the legacy MAC layer format, determining that the remainder of the frame is formatted in accordance with the protocol of the wireless communication device. Note that the legacy physical layer format includes at least one of IEEE 802.11a, IEEE 802.11b, and IEEE 802.11g and wherein the protocol of the wireless communication device includes IEEE 802.11n.

The process then proceeds to step 188 where the wireless communication device, based on the interpreting of the at least a portion of the wireless communication set up information, determines whether a remainder of the frame is formatted in accordance with the protocol of the wireless communication device. The process then branches at step 190 to step 194 when the remainder of the frame is formatted in accordance with the protocol of the wireless communication device and to step 192 when it does not. At step 192 the wireless communication device ignores the frame. At step 194, the wireless communication device processes the remainder of the frame based in accordance with the protocol of the wireless communication device.

Figure 17:
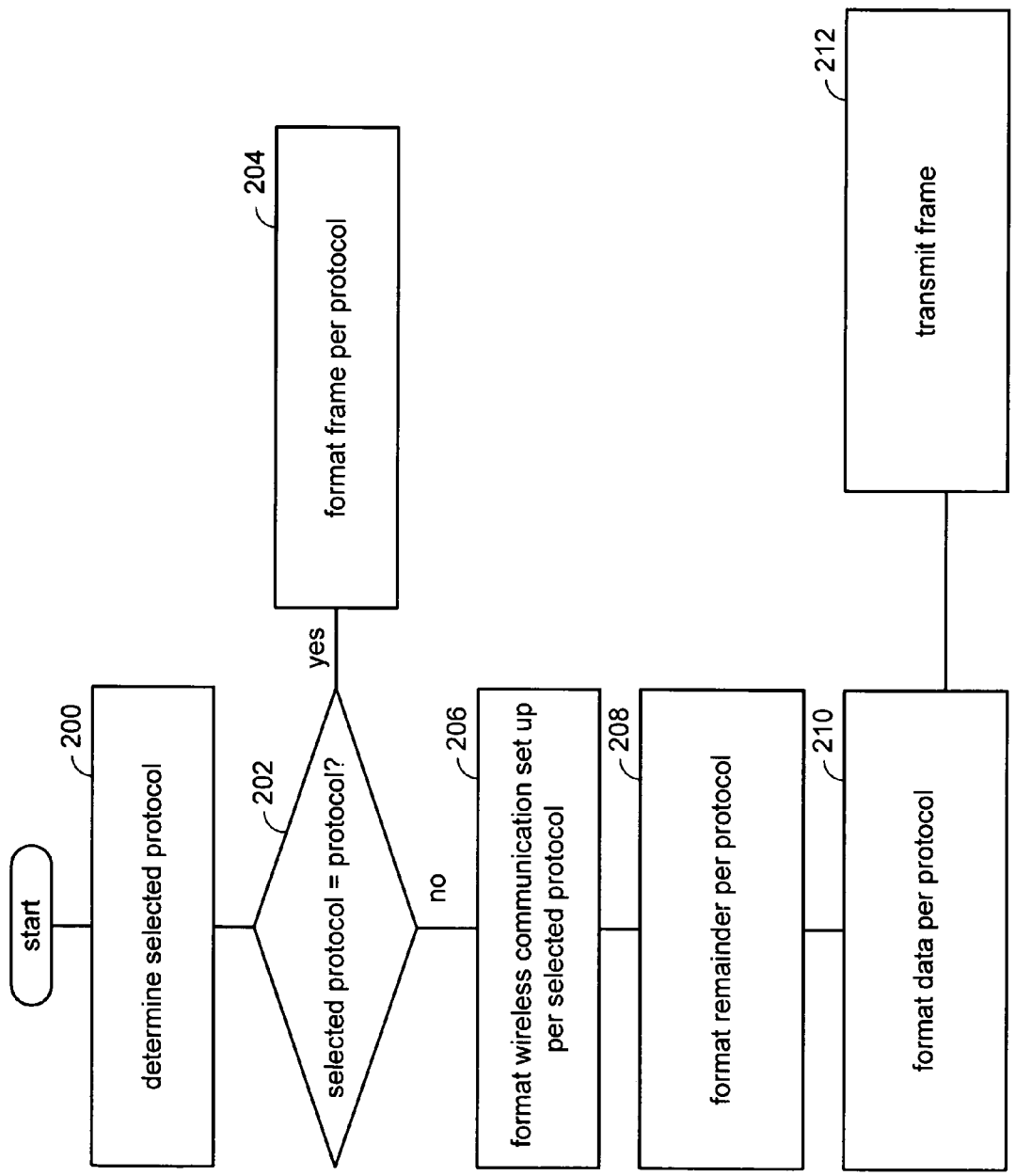
FIG. 17 is a logic diagram of yet another method for a wireless communication device to participate in a multiple protocol communication in accordance with the present invention.

FIG. 17 is a logic diagram of a method for a wireless communication device to participate in multiple protocol wireless communications. The method begins at step 200 where the wireless communication device determines whether a selected protocol is of a like protocol of the wireless communication device. The process branches at step 202 to step 204 when the selected protocol is the protocol of the wireless communication device and to step 206 when the protocols differ. At step 204, the wireless communication device formats the set up information portion of a frame and a data portion of the frame in accordance with its protocol. The wireless communication device then transmits the frame.

If, however, the selected protocol is not of the like protocol of the wireless communication device, the process proceeds to step 206 where the wireless communication device formats a portion of wireless communication set up information in accordance with the selected protocol to produce legacy formatted set up information. The process then proceeds to step 208 where the wireless communication device formats remainder of the wireless communication set up information in accordance with the protocol of the wireless communication device to produce current formatted set up information. The process then proceeds to step 210 where the wireless communication device formats data in accordance with the protocol of the wireless communication device to produce current formatted data. Refer to the previous Figures for examples of such formatting. The process then proceeds to step 212 where the wireless communication device transmits a frame containing the legacy formatted set up information, the current formatted set up information, and the current formatted data.

In an embodiment of the present invention, the preamble should be backward compatible with existing 802.11 standards. An issue in TGn is how to interoperate with legacy 802.11a and 802.11b/g devices, where interoperation includes two cases:

Same BSS (Basic Service Set): All devices communicating with the same AP (Access Point).

Co-channel/"overlapping" BSS

Such can be addressed by designing the PLCP (Physical Layer Convergence Procedure) header to allow an 802.11a/g STA (Station) to de-assert CCA (Collision Avoidance) or to use a protection mechanism like RTS/CTS (Request to Send/Clear to Send) or CTS-to-self.

802.11g chose the latter in dealing with 802.11b devices. To some extent, RTS/CTS can be relied on to protect bursts.

For an unchanged SIGNAL field of the PLCP header decoding at legacy stations, it is desirable to use the same linear weighting of the existing long training and SIGNAL symbols at the transmitter antenna inputs. With a MISO (Multiple Input Single Output) system, the same weighting should be applied to the first two long training symbols and the legacy SIGNAL field for decoding by legacy stations.

For the case of M transmitter antennas, N receiver antennas and a sequence of L transmitted symbols, Xk is the received signal on sub-carrier k:

$$X_k = S_k \cdot H_k + N_k \qquad \overrightarrow{RX \text{ antennas}}$$

$$H_k = \begin{pmatrix} h_k^{(0,0)} & h_k^{(0,1)} & \cdots & h_k^{(0,N-1)} \\ h_k^{(1,0)} & h_k^{(1,1)} & \cdots & h_k^{(1,N-1)} \\ \vdots & \vdots & \ddots & \vdots \\ h_k^{(M-1,0)} & h_k^{(M-1,1)} & \cdots & h_k^{(M-1,N-1)} \end{pmatrix} \Bigg\downarrow TX \text{ antennas}$$

$$S_k = \begin{pmatrix} s_k^{(0,0)} & s_k^{(0,1)} & \cdots & s_k^{(0,M-1)} \\ s_k^{(1,0)} & s_k^{(1,1)} & \cdots & s_k^{(1,M-1)} \\ \vdots & \vdots & \ddots & \vdots \\ s_k^{(L-1,0)} & s_k^{(L-1,1)} & \cdots & s_k^{(L-1,M-1)} \end{pmatrix}$$

The zero-forcing (ZF) MIMO channel estimate is then computed as:

$$\hat{H}_k = (S_k^H \cdot S_k)^{-1} \cdot S_k^H \cdot X_k = \frac{1}{M} \cdot S_k^H \cdot X_k$$

if the long training symbol sequence is defined well (i.e., Sk ends up being a real scalar times a unitary matrix).

The minimum mean-square error (MMSE) channel estimate is computed as:

$$\hat{H}_k = (S_k^H \cdot S_k + \sigma_\eta^2 \cdot I)^{-1} \cdot S_k^H \cdot X_k = \rho \cdot S_k^H \cdot X_k$$

$$\rho = \frac{1}{M + \sigma_\eta^2}$$

where, for simplicity, hk was assumed to be i.i.d. Gaussian and, again, use the "good long training choice". Note that performance of the MMSE vs. ZF estimation may be omitted for the sequences chosen in the following, since S was carefully chosen as previously shown.

Figure 18:
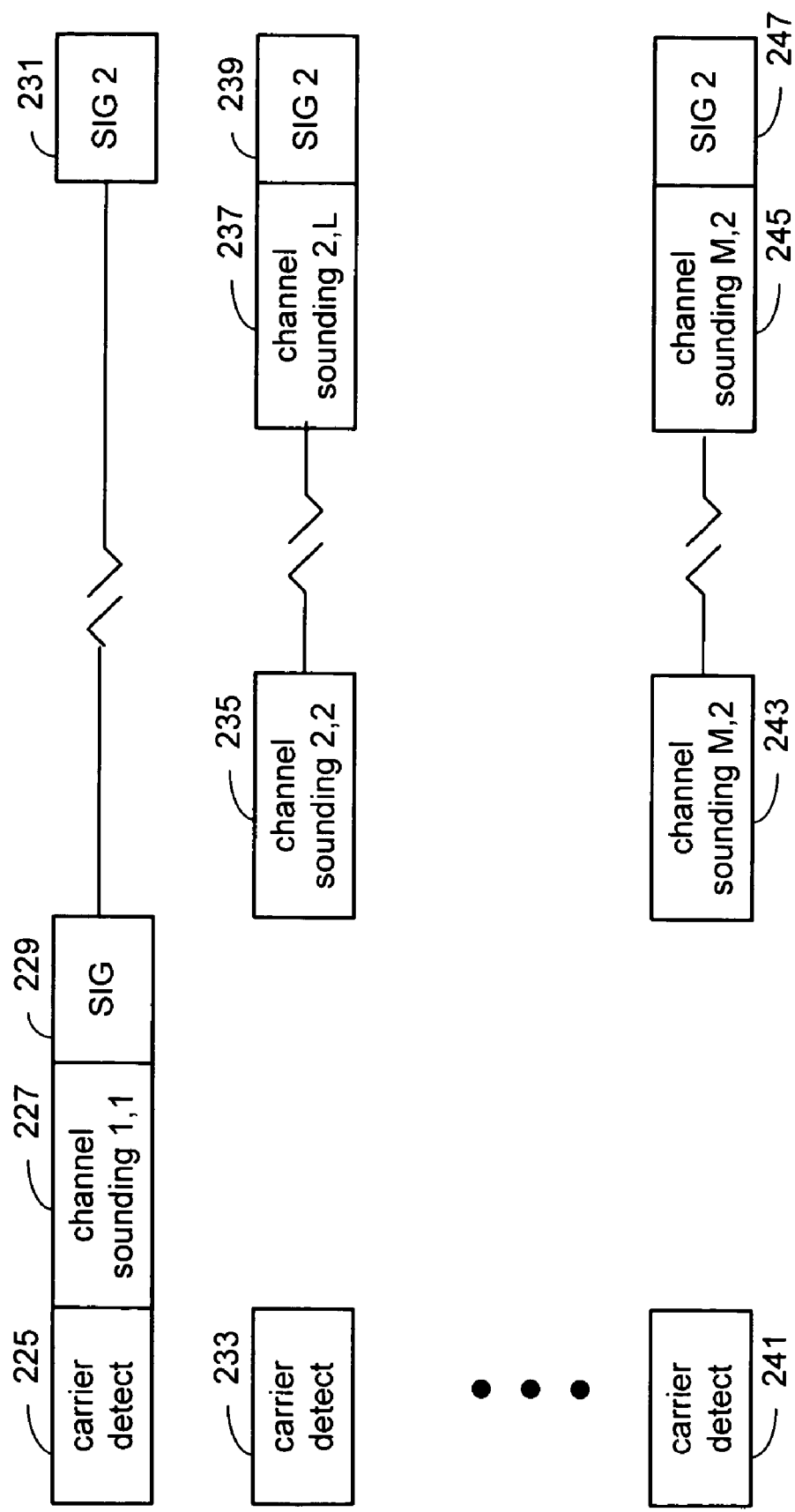
FIG. 18 is a diagram of simultaneous second channel sounding in accordance with the present invention.

FIG. 18 is a diagram of simultaneous second channel sounding in accordance with the present invention. In this illustration, 802.11a short symbols are sent on antenna 1 during "Carrier Detect" period 225, 233, 241. "Carrier Detect" symbols 225, 233, 245 for antennas 2 . . . M are the same as those transmitted on antenna 1, except cyclically shifted (rotated) by Tsample*round((k−1)*(800/Tsample)/M) nsec., where Tsample is 50 nsec. for 20 MHz channels and 25 nsec. for 40 MHz channels and k is the antenna number, 2 . . . M. The first channel sounding symbols 227 and SIGNAL field 229 are the long training symbols and SIGNAL field of 802.11a and are sent only from antenna 1. These are used for computing an estimate of the channel from transmit antenna 1 to every receiver antenna.

The second channel sounding symbols 235, 237, 243, 245 are transmitted on antennas 2 . . . M and are used for computing an estimate of the channel from transmit antennas 2 to every receiver antenna. SIG2 231, 239, 247 is a new signal field (for 802.11n), which encodes the 802.11n rate and frame length information. Average output power is scaled to be constant throughout the frame, averaged across all transmit antennas.

Figure 19:
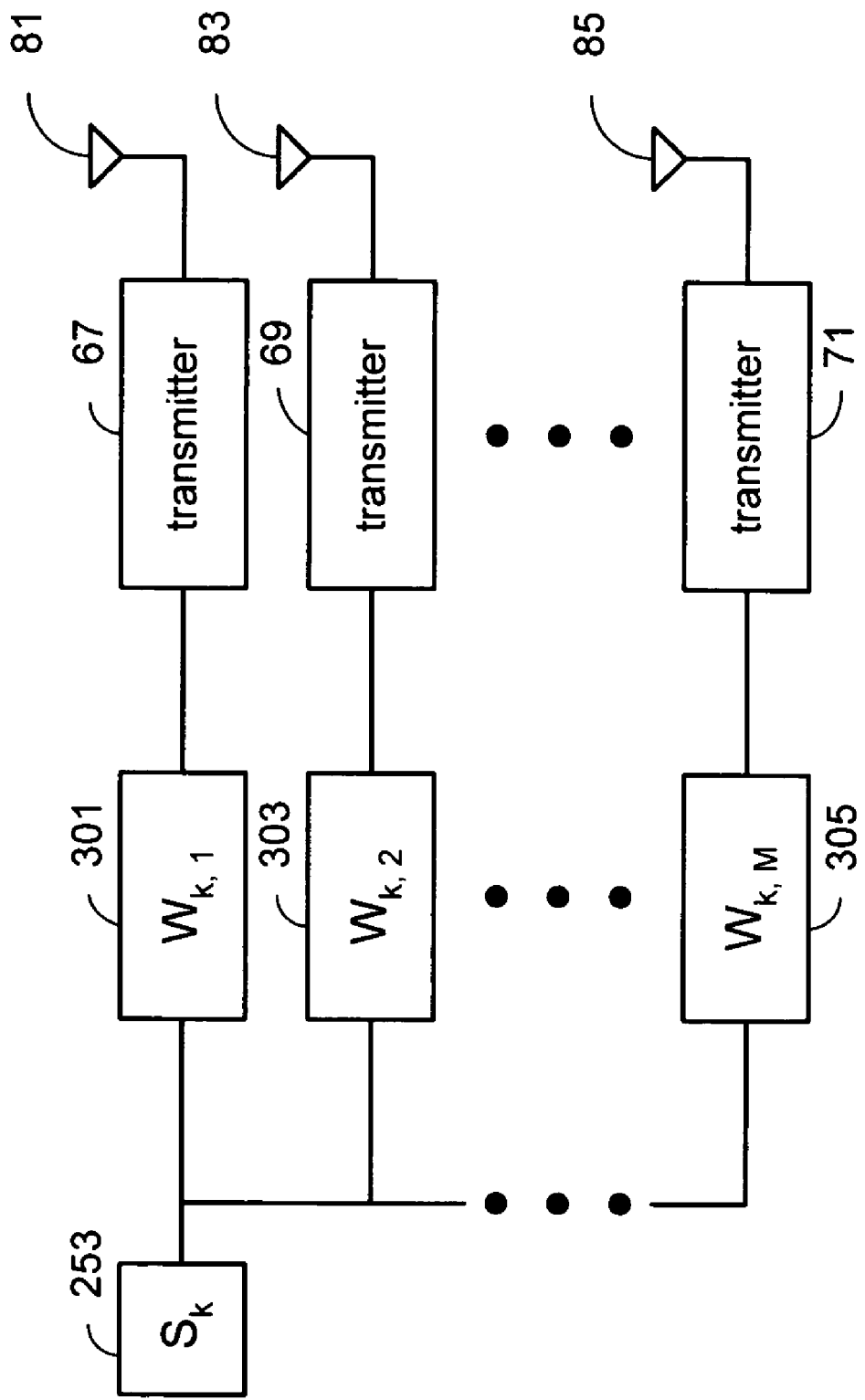
FIG. 19 is another diagram of simultaneous second channel sounding in accordance with the present invention.

FIG. 19 is a diagram illustrating a transmission model of the frame format of FIG. 7. For this transmission format, in order to satisfy backwards compatibility issues and also to satisfy the requirements of the next generation channel estimation requirements, W is chosen such that W and $W^{-1}$ are simple to implement. Further, any beam forming issues from MIMO transmitters (next generation devices) by $[w_{11} \ldots w_{1M}]$ should be well-received by legacy 802.11a/g devices.

In this embodiment, a channel sounding ($S_k$) 253 is multiplied by a plurality of weighting factors ($W_{k,m}$) 301, 303, 305, wherein k corresponds to the channel sounding number, which ranges from 1 to 1, and m corresponds to the number of transmit antennas 82–86. The resulting weighted channel soundings are converted to RF signals via the transmitters 67, 69, 71 and subsequently transmitted via the antennas 81, 83, 85. In such an embodiment, a weighting factor matrix may be as follows:

$$\begin{bmatrix} w_{11} & w_{12} & \cdots & w_{1M} \\ w_{21} & w_{22} & \cdots & w_{2M} \\ \vdots & \vdots & \ddots & \vdots \\ w_{L1} & w_{L2} & \cdots & w_{LM} \end{bmatrix} S_k$$

With transmissions occurring on all antennas at all times, nulls may be formed. The nulls may be compensated for by selecting a weight sequence that acts as a beam former such that the nulls are steered in particular directions. For example, for the case of the vector $w_1=[11]$ (one row of the previous slide's W matrix for a 2 TX case), nulls would be steered in the directions −90° and +90°. Thus, certain directions are disadvantaged vs. others at a single-input receiver of a legacy WLAN device.

According to the present invention, a different complex weight is applied to each subcarrier on M−1 of the transmit antennas. This forms a different beam pattern on each subcarrier and results in less power and capacity loss in the worst directions. This is illustrated in FIGS. 20 and 21.

Figure 20:
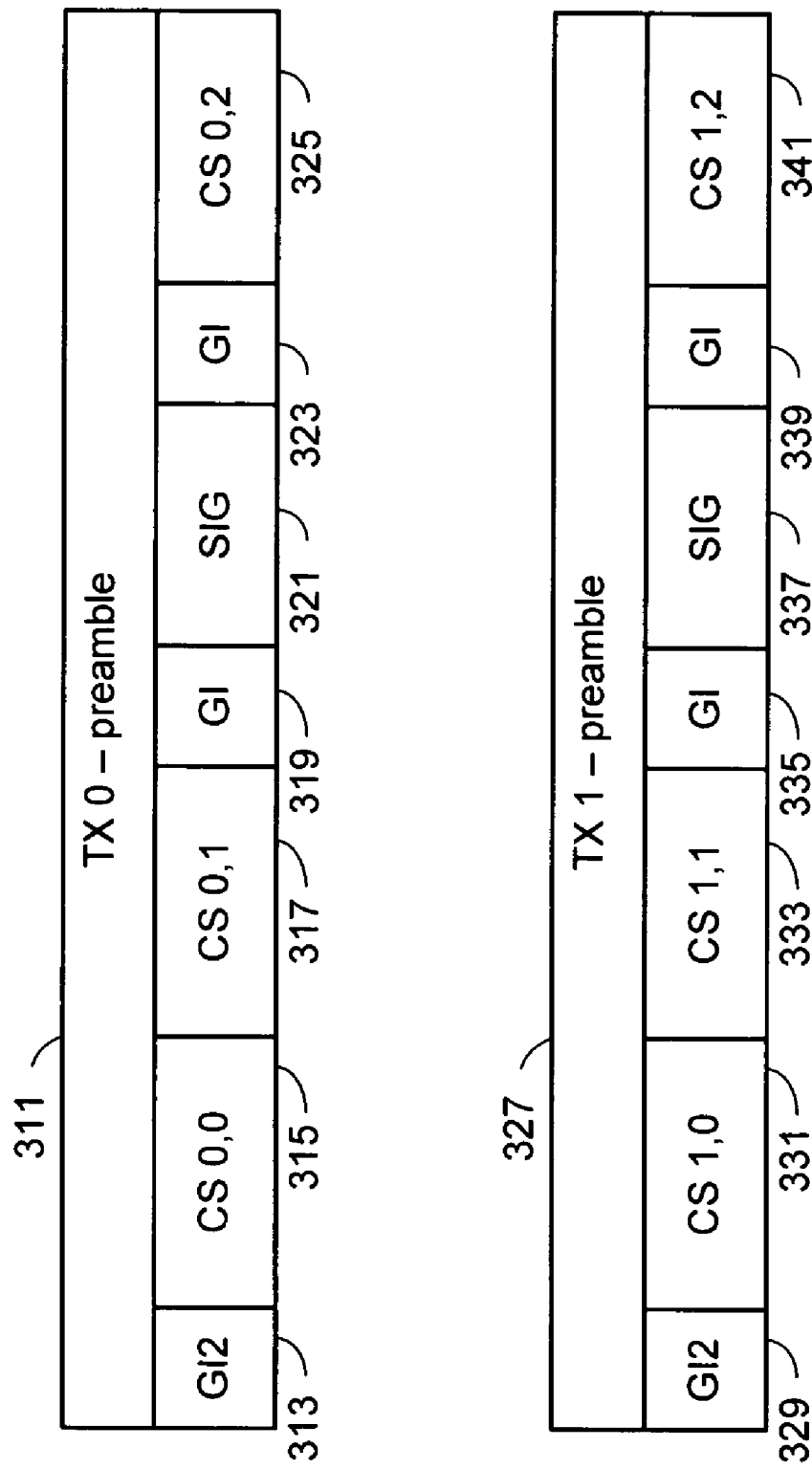
FIG. 20 is yet another diagram of simultaneous second channel sounding in accordance with the present invention.
Figure 21:
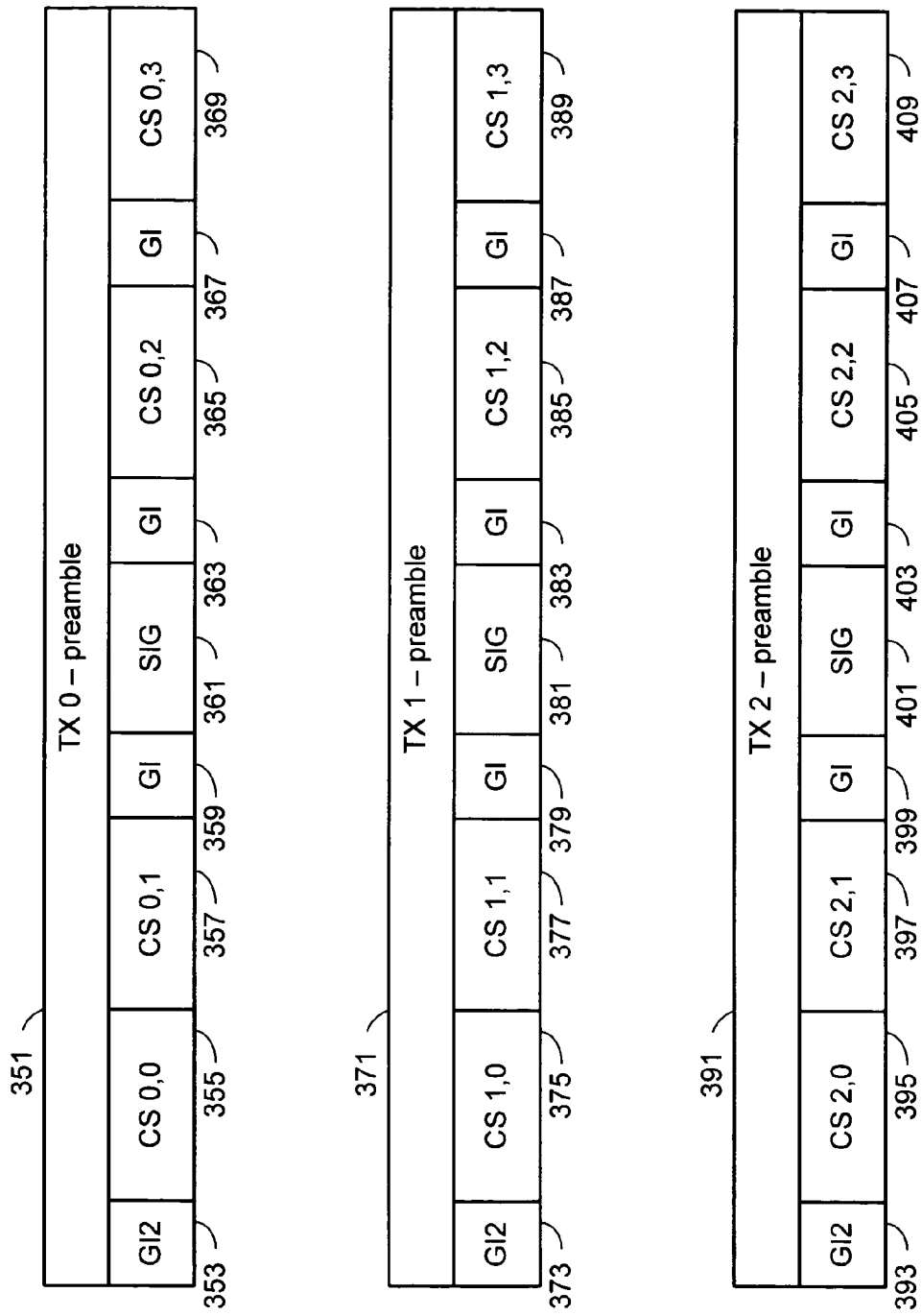
FIG. 21 is a further diagram of simultaneous second channel sounding in accordance with the present invention.

FIG. 20 is a diagram illustrating the manner in which a preamble of the frame format of FIG. 7 is formed for a generalized next generation MIMO transmitter and particularly for a two antenna next generation MIMO transmitter. In this illustration, two preambles are generated: one for each active antenna. The first preamble 311, which is transmitted by the first antenna, includes a double guard interval (GI2) 313, a first channel sounding (CS 0,0) 315, a second channel sounding (CS 0,1) 317, a guard interval (GI) 319, a signal field (SIG) 321, another guard interval (GI) 323, and a third channel sounding (CS 0,2) 325. The second preamble 327, which is transmitted by the second antenna, includes a double guard interval (GI2) 329, a first channel sounding (CS 1,0) 331, a second channel sounding (CS 1,1) 333, a guard interval (GI) 335, a signal field (SIG) 337, another guard interval (GI) 339, and a third channel sounding (CS 1,2) 341.

In this embodiment, the following may be used for the various channel soundings:

$S_{01}=S_{00}$ $S_{10,k}=-S_{00,k} \cdot e^{i \cdot \theta_k}$ $S_{11}=S_{10}$ $S_{02}=S_{00}$ $S_{12,k}=S_{00,k} \cdot e^{i \cdot \theta_k}$ From these channel soundings, the weighting factor may be applied as follows:

$$S_k = \begin{bmatrix} s_{10,k} & s_{11,k} \\ s_{20,k} & s_{21,k} \end{bmatrix} = s_{00,k} \cdot \begin{bmatrix} 1 & -1 \\ 1 & 1 \end{bmatrix} \cdot \begin{bmatrix} 1 & 0 \\ 0 & e^{i \cdot \theta_k} \end{bmatrix} = \begin{bmatrix} s_{00,k} & -s_{00,k} \cdot e^{i \cdot \theta_k} \\ s_{00,k} & s_{00,k} \cdot e^{i \cdot \theta_k} \end{bmatrix}$$

where the first digital of the subscript of a channel sounding corresponds to the number of antennas, the second digit corresponds to the number of symbols, and the k corresponds to the number of channel soundings. For example, $S_{10,k}$ corresponds to the first symbol transmitted on the first antenna for the kth channel sounding.

To obtain a different beam pattern for each subcarrier, the following is applied:

$$\theta_k = \pi \cdot k / 6, k = \frac{N_{subcarriers}}{2} \ldots \frac{N_{subcarriers}}{2}$$

FIG. 21 is a diagram illustrating the manner in which a preamble of the frame format of FIG. 7 is formed for a three antenna next generation MIMO transmitter. In this illustration, three preambles are generated: one for each active antenna. The first preamble 351, which is transmitted by the first antenna, includes a double guard interval (GI2) 353, a first channel sounding (CS 0,0) 355, a second channel sounding (CS 0,1) 357, a guard interval (GI) 359, a signal field (SIG) 361, another guard interval (GI) 363, a third channel sounding (CS 0,2) 365, a third guard interval (GI) 367, and a fourth channel sounding (CS 0,3) 369. The second preamble 371, which is transmitted by the second antenna, includes a double guard interval (GI2) 373, a first channel sounding (CS 1,0) 375, a second channel sounding (CS 1,1) 377, a guard interval (GI) 379, a signal field (SIG) 381, another guard interval (GI) 383, a third channel sounding (CS 1,2) 385, a third guard interval (GI) 387, and a fourth channel sounding (CS 1,3) 389. The third preamble 391, which is transmitted by the third antenna, includes a double guard interval (GI2) 393, a first channel sounding (CS 2,0) 395, a second channel sounding (CS 2,1) 397, a guard interval (GI) 399, a signal field (SIG) 401, another guard interval (GI) 403, a third channel sounding (CS 2,2) 405, a third guard interval (GI) 407, and a fourth channel sounding (CS 2,3) 409.

For the various channel soundings, the weighting factor matrix may be applied as follows:

$$S_k = \begin{bmatrix} s_{10,k} & s_{11,k} & s_{12,k} \\ s_{20,k} & s_{21,k} & s_{22,k} \\ s_{30,k} & s_{31,k} & s_{32,k} \end{bmatrix} =$$

$$\begin{bmatrix} s_{00,k} & s_{00,k} \cdot e^{i \cdot \theta_k} & s_{00,k} \cdot e^{i \cdot \theta_k} \\ s_{00,k} & s_{00,k} \cdot e^{i(\theta_k - \frac{4\pi}{3})} & s_{00,k} \cdot e^{i(\theta_k - \frac{2\pi}{3})} \\ s_{00,k} & s_{00,k} \cdot e^{i(\theta_k - \frac{2\pi}{3})} & s_{00,k} \cdot e^{i(\theta_k - \frac{4\pi}{3})} \end{bmatrix}$$

To obtain a different beam pattern for each subcarrier, the following is applied:

$\theta_k = \pi \cdot k / 6$ $\phi_k = \pi \cdot (k+4)/6$

From FIGS. 20 and 21 more signal energy may be transmitted resulting in better channel estimates by the receiver. This enables a more simplified ZF or MMSE channel estimation at Rx (mostly adds/shifts) in that:

$$W_\tau = \begin{bmatrix} +1 & -1 \\ +1 & +1 \end{bmatrix} \Rightarrow W_\tau^{-1} = \frac{1}{2}\begin{bmatrix} +1 & +1 \\ -1 & +1 \end{bmatrix}$$

$$W_\tau = \begin{pmatrix} 1 & 1 & 1 \\ 1 & \frac{-1 - i \cdot \sqrt{3}}{2} & \frac{-1 + i \cdot \sqrt{3}}{2} \\ 1 & \frac{-1 + i \cdot \sqrt{3}}{2} & \frac{-1 - i \cdot \sqrt{3}}{2} \end{pmatrix} \Rightarrow W_\tau^{-1} =$$

$$\frac{1}{3} \cdot \begin{pmatrix} 1 & 1 & 1 \\ 1 & \frac{-1 + i \cdot \sqrt{3}}{2} & \frac{-1 - i \cdot \sqrt{3}}{2} \\ 1 & \frac{-1 - i \cdot \sqrt{3}}{2} & \frac{-1 + i \cdot \sqrt{3}}{2} \end{pmatrix}$$

The channel may be estimated with prior knowledge of the per-subcarrier beamforming coefficients and then these coefficients do not need to be applied to the remaining transmitted symbols. The advantage of this is that no extra multiplications are required on the transmitter side, as the LTRN sequence may simply be looked up in a table.

The channel may be estimated without knowledge of the per-subcarrier beamforming coefficients and then these coefficients should be applied to the remaining transmitted symbols. The advantage of this is that the receiver channel estimation is simplified (fewer multiplies), but the transmitter performs additional multiplications.

First case, using earlier notation and L=M:

$$\hat{H}_k = \frac{1}{M} \cdot s^*_{00,k} \cdot W^H_{B,k} \cdot W^H_T \cdot X_k$$

$$W_{B,k} = diag\left(\begin{bmatrix} 1 & e^{\frac{i \cdot \pi \cdot l_1}{6}} & \cdots & e^{\frac{i \cdot \pi \cdot l_{M-1}}{6}} \end{bmatrix}\right)$$

Second case, using earlier notation and L=M:

$$\hat{H}_k = \frac{1}{M} \cdot s^*_{00,k} \cdot W^H_T \cdot X_k$$

Note that further refinement of the channel estimate is possible by duplicating the entire length-M sequence p times. The refinement may be made by simple averaging. The overhead is identical to the single active transmitter method described on slide 10, but the performance is far superior.

For the backward-compatible preamble case, in which the number of long training symbols is M+1, the longer sequence would consist of p*M+1 long training symbols. There are p identical blocks of M symbols, and the first and second symbols on each antenna are identical.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments for wireless communications in a wireless communication system that includes a plurality of wireless communication devices of differing protocols. As one of average skill in the art will appreciate, other embodiments may be derived from the teachings of the present invention without deviating from the scope of the claims.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1

| PSD Mask | 1 |
|---|---|
| Frequency Offset | dBr |
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |

TABLE 5-continued

Channelization for Table 4

| Channel | Frequency (MHz) | Country | Channel | Frequency (MHz) | Country |
|---|---|---|---|---|---|
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10

| PSD Mask | 2 |
|---|---|
| Frequency Offset | dBr |
| −19 MHz to 19 MHz | 0 |

TABLE 11-continued

Power Spectral Density (PSD) mask for Table 10

| | |
|---|---|
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A method for configuring a multiple input multiple output (MIMO) wireless communication, the method comprises:

generating a first preamble for a first antenna of the MIMO communication, wherein the first preamble includes a carrier detect field, a first channel select field, a first signal field, and a second signal field;

generating a second preamble for at least one other antenna of the MIMO communication, wherein the second preamble includes the carrier detect field, a plurality of channel select fields, and the second signal field;

simultaneously transmitting the carrier detect field via the first antenna and the least one other antenna;

transmitting the first channel select field and the first signal field via the first antenna;

subsequent to the transmitting the first channel select field and the first signal field via the first antenna, transmitting the plurality of channel select fields via the at least one other antenna; and simultaneously transmitting the second signal field via the first antenna and the at least one other antenna.

2. The method of claim 1, wherein the simultaneously transmitting the carrier detect field via the first antenna and the least one other antenna comprises:

cyclically rotating the carrier detect field of the at least one other antenna with respect to the carrier detect field of the first antenna.

3. The method of claim 1, wherein the generating of the first channel select field and the first signal field of the first preamble comprises:

generating a long training sequence in accordance with IEEE 802.11a for the first channel select field; and generating the first signal field in accordance with IEEE 802.11a.

4. The method of claim 1, wherein the second signal field comprises:

rate information and frame length information for a frame of the MIMO communication.

5. The method of claim 1 further comprises:

generating the second preamble for a plurality of antennas of the MIMO communication, wherein the second preamble includes the carrier detect field, a plurality of channel select fields, and the second signal field, wherein the plurality of antennas includes the at least one other antenna;

simultaneously transmitting the carrier detect field via the first antenna and the plurality of antennas;

transmitting the first channel select field and the first signal field via the first antenna;

subsequent to the transmitting the first channel select field and the first signal field via the first antenna, simultaneously transmitting the plurality of channel select fields via the plurality of antennas; and simultaneously transmitting the second signal field via the first antenna and the plurality of antennas.

6. A method for Multiple Input Multiple Output (MIMO) communication using multiple protocol wireless communications, the method comprises:

determining protocols of wireless communication devices within a proximal region;

determining whether the protocols of the wireless communication devices within the proximal region are of a like protocol;

when the protocols of the wireless communication devices within the proximal region are not of a like protocol, selecting a protocol of the protocols of the wireless communication devices within the proximal region based on a protocol ordering to produce a selected protocol; and in accordance with the selected protocol:

generating a first preamble for a first antenna of the MIMO communication, wherein the first preamble includes a carrier detect field, a first channel select field, a first signal field, and a second signal field;

generating a second preamble for at least one other antenna of the MIMO communication, wherein the second preamble includes the carrier detect field, a plurality of channel select fields, and the second signal field;

simultaneously transmitting the carrier detect field via the first antenna and the least one other antenna;

transmitting the first channel select field and the first signal field via the first antenna;

subsequent to the transmitting the first channel select field and the first signal field via the first antenna, transmitting the plurality of channel select fields via the at least one other antenna; and simultaneously transmitting the second signal field via the first antenna and the at least one other antenna.

7. The method of claim 6, wherein the simultaneously transmitting the carrier detect field via the first antenna and the least one other antenna comprises:

cyclically rotating the carrier detect field of the at least one other antenna with respect to the carrier detect field of the first antenna.

8. The method of claim 6, wherein the generating of the first channel select field and the first signal field of the first preamble comprises:

generating a long training sequence in accordance with IEEE 802.11a for the first channel select field; and generating the first signal field in accordance with IEEE 802.11a.

9. The method of claim 6, wherein the second signal field comprises:
rate information and frame length information for a frame of the MIMO communication.

10. The method of claim 6 further comprises:
generating the second preamble for a plurality of antennas of the MIMO communication, wherein the second preamble includes the carrier detect field, a plurality of channel select fields, and the second signal field, wherein the plurality of antennas includes the at least one other antenna;
simultaneously transmitting the carrier detect field via the first antenna and the plurality of antennas;
transmitting the first channel select field and the first signal field via the first antenna;
subsequent to the transmitting the first channel select field and the first signal field via the first antenna, simultaneously transmitting the plurality of channel select fields via the plurality of antennas; and
simultaneously transmitting the second signal field via the first antenna and the plurality of antennas.

11. A radio frequency (RF) transmitter for Multiple Input Multiple Output (MIMO) communications comprises:
a transmitter section operably coupled to convert outbound symbol data into outbound RF signals; and
a baseband processing module operably coupled to convert outbound data into the outbound symbol data, wherein the baseband processing module is further operably coupled to, for a MIMO communication:
generate a first preamble for a first antenna of the transmitter section, wherein the first preamble includes a carrier detect field, a first channel select field, a first signal field, and a second signal field;
generate a second preamble for at least one other antenna of the transmitter section, wherein the second preamble includes the carrier detect field, a plurality of channel select fields, and the second signal field;
facilitate simultaneous transmission of the carrier detect field via the first antenna and the least one other antenna;
facilitate transmission of the first channel select field and the first signal field via the first antenna;
subsequent to the transmitting the first channel select field and the first signal field via the first antenna, facilitate transmission of the plurality of channel select fields via the at least one other antenna; and
facilitate simultaneous transmission of the second signal field via the first antenna and the at least one other antenna.

12. The RF transmitter of claim 11, wherein the baseband processing module is further operably couple to facilitate the simultaneous transmission of the carrier detect field via the first antenna and the least one other antenna by:
cyclically rotating the carrier detect field of the at least one other antenna with respect to the carrier detect field of the first antenna.

13. The RF transmitter of claim 11, wherein the baseband processing module is further operably couple to generate the first channel select field and the first signal field of the first preamble by:
generating a long training sequence in accordance with IEEE 802.11a for the first channel select field; and
generating the first signal field in accordance with IEEE 802.11a.

14. The RF transmitter of claim 11, wherein the second signal field comprises:
rate information and frame length information for a frame of the MIMO communication.

15. The RF transmitter of claim 11, wherein the baseband processing module is further operably couple to:
generate the second preamble for a plurality of antennas of the transmitter section, wherein the second preamble includes the carrier detect field, a plurality of channel select fields, and the second signal field, wherein the plurality of antennas includes the at least one other antenna;
facilitate simultaneous transmission of the carrier detect field via the first antenna and the plurality of antennas;
facilitate transmission of the first channel select field and the first signal field via the first antenna;
subsequent to the transmitting the first channel select field and the first signal field via the first antenna, facilitate simultaneous transmission of the plurality of channel select fields via the plurality of antennas; and
facilitate simultaneous transmission of the second signal field via the first antenna and the plurality of antennas.

* * * * *